(12) United States Patent
Gokhale et al.

(10) Patent No.: US 9,633,025 B2
(45) Date of Patent: Apr. 25, 2017

(54) DATA STORAGE SYSTEM FOR ANALYSIS OF DATA ACROSS HETEROGENEOUS INFORMATION MANAGEMENT SYSTEMS

(71) Applicant: Commvault Systems, Inc., Tinton Falls, NJ (US)

(72) Inventors: Parag Gokhale, Marlboro, NJ (US); Parminder Singh, Iselin, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 0 days.

(21) Appl. No.: 14/918,037

(22) Filed: Oct. 20, 2015

(65) Prior Publication Data

US 2016/0041997 A1    Feb. 11, 2016

Related U.S. Application Data

(63) Continuation of application No. 13/777,140, filed on Feb. 26, 2013, now abandoned.

(60) Provisional application No. 61/745,034, filed on Dec. 21, 2012.

(51) Int. Cl.
*G06F 17/30* (2006.01)
*G06F 3/0482* (2013.01)

(52) U.S. Cl.
CPC ...... *G06F 17/30082* (2013.01); *G06F 3/0482* (2013.01); *G06F 17/30126* (2013.01); *G06F 17/30424* (2013.01); *G06F 17/30554* (2013.01); *G06F 17/30958* (2013.01)

(58) Field of Classification Search
CPC .... G06F 3/0482; G06F 3/0604; G06F 3/0605; G06F 3/067; G06F 17/30082; G06F 17/30126; G06F 17/30392; G06F 17/30398; G06F 17/30424; G06F 17/30545; G06F 17/30554; G06F 17/30566; G06F 17/30569; G06F 17/30958; G06F 11/1458; G06F 17/1461
USPC .................. 707/770; 709/223, 224; 711/162
See application file for complete search history.

(56) References Cited

U.S. PATENT DOCUMENTS

| | | | |
|---|---|---|---|
| 4,686,620 | A | 8/1987 | Ng |
| 4,995,035 | A | 2/1991 | Cole et al. |
| 5,005,122 | A | 4/1991 | Griffin et al. |
| 5,093,912 | A | 3/1992 | Dong et al. |
| 5,133,065 | A | 7/1992 | Cheffetz et al. |

(Continued)

FOREIGN PATENT DOCUMENTS

| | | |
|---|---|---|
| EP | 0259912 A1 | 3/1988 |
| EP | 0405926 A2 | 1/1991 |

(Continued)

OTHER PUBLICATIONS

U.S. Appl. No. 14/743,790, filed Jun. 18, 21015, Krishana, Praveen K., et al.

(Continued)

*Primary Examiner* — Alex Gofman
*Assistant Examiner* — Umar Mian
(74) *Attorney, Agent, or Firm* — Perkins Coie LLP

(57) ABSTRACT

Systems and methods for generating customized reports from data storage databases and other information management system databases. The methods include normalizing queried information from different types of information management system databases to enable system-wide report generation. Other implementations are disclosed.

19 Claims, 17 Drawing Sheets

(56) References Cited

U.S. PATENT DOCUMENTS

| | | |
|---|---|---|
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,448,724 A | 9/1995 | Hayashi |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,619,644 A | 4/1997 | Crockett et al. |
| 5,638,509 A | 6/1997 | Dunphy et al. |
| 5,673,381 A | 9/1997 | Huai et al. |
| 5,678,042 A | 10/1997 | Pisello et al. |
| 5,699,361 A | 12/1997 | Ding et al. |
| 5,729,743 A | 3/1998 | Squibb |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,950,205 A | 9/1999 | Aviani, Jr. |
| 5,974,563 A | 10/1999 | Beeler, Jr. |
| 6,021,415 A | 2/2000 | Cannon et al. |
| 6,026,414 A | 2/2000 | Anglin |
| 6,052,735 A | 4/2000 | Ulrich et al. |
| 6,076,148 A | 6/2000 | Kedem |
| 6,094,416 A | 7/2000 | Ying |
| 6,131,095 A | 10/2000 | Low et al. |
| 6,131,147 A | 10/2000 | Takagi |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,389,432 B1 | 5/2002 | Pothapragada et al. |
| 6,418,478 B1 | 7/2002 | Ignatius et al. |
| 6,421,711 B1 | 7/2002 | Blumenau et al. |
| 6,487,561 B1 | 11/2002 | Ofek et al. |
| 6,519,679 B2 | 2/2003 | Devireddy et al. |
| 6,538,669 B1 | 3/2003 | Lagueux, Jr. et al. |
| 6,542,972 B2 | 4/2003 | Ignatius et al. |
| 6,564,228 B1 | 5/2003 | O'Connor |
| 6,625,747 B1 | 9/2003 | Tawil et al. |
| 6,658,436 B2 | 12/2003 | Oshinsky et al. |
| 6,658,526 B2 | 12/2003 | Nguyen et al. |
| 6,771,595 B1 | 8/2004 | Gilbert et al. |
| 6,820,035 B1 | 11/2004 | Zahavi |
| 7,007,042 B2 | 2/2006 | Lubbers |
| 7,035,880 B1 | 4/2006 | Crescenti et al. |
| 7,039,827 B2 | 5/2006 | Meyer et al. |
| 7,082,441 B1 | 7/2006 | Zahavi et al. |
| 7,085,904 B2 | 8/2006 | Mizuno et al. |
| 7,093,089 B2 | 8/2006 | de Brebisson |
| 7,093,194 B2 | 8/2006 | Nelson et al. |
| 7,096,269 B2 | 8/2006 | Yamagami |
| 7,096,315 B2 | 8/2006 | Takeda et al. |
| 7,103,740 B1 | 9/2006 | Colgrove et al. |
| 7,130,970 B2 | 10/2006 | Devassy et al. |
| 7,146,377 B2 | 12/2006 | Nowicki et al. |
| 7,171,459 B2 | 1/2007 | Sanghvi et al. |
| 7,197,490 B1 | 3/2007 | English |
| 7,203,944 B1 | 4/2007 | van Rietschote et al. |
| 7,213,040 B1 | 5/2007 | Stokes et al. |
| 7,216,244 B2 | 5/2007 | Amano |
| 7,225,356 B2 | 5/2007 | Monitzer |
| 7,243,093 B2 | 7/2007 | Cragun et al. |
| 7,275,103 B1 | 9/2007 | Thrasher et al. |
| 7,287,063 B2 | 10/2007 | Baldwin |
| 7,328,260 B1 | 2/2008 | Muthiyan et al. |
| 7,343,356 B2 | 3/2008 | Prahlad et al. |
| 7,343,453 B2 | 3/2008 | Prahlad et al. |
| 7,343,459 B2 | 3/2008 | Prahlad et al. |
| 7,346,623 B2 | 3/2008 | Prahlad et al. |
| 7,346,751 B2 | 3/2008 | Prahlad et al. |
| 7,373,415 B1 | 5/2008 | DeShan et al. |
| 7,395,282 B1 | 7/2008 | Crescenti et al. |
| 7,401,338 B1 | 7/2008 | Bowen et al. |
| 7,403,987 B1 | 7/2008 | Marinelli et al. |
| 7,454,569 B2 | 11/2008 | Kavuri et al. |
| 7,493,300 B2 | 2/2009 | Palmer |
| 7,546,323 B1* | 6/2009 | Timmins ............. G06F 11/1464 |
| 7,565,661 B2 | 7/2009 | Sim-Tang |
| 7,640,496 B1* | 12/2009 | Chaulk ................ G06F 3/067 |
| | | 707/999.102 |
| 7,644,245 B2 | 1/2010 | Prahlad et al. |
| 7,685,128 B2 | 3/2010 | Anderson |
| 7,765,167 B2 | 7/2010 | Prahlad et al. |
| 7,917,695 B2 | 3/2011 | Ulrich et al. |
| 7,934,071 B2 | 4/2011 | Abe et al. |
| 7,945,810 B2 | 5/2011 | Soran et al. |
| 8,060,587 B2 | 11/2011 | Ahmad |
| 8,086,907 B1 | 12/2011 | Narin et al. |
| 8,112,605 B2 | 2/2012 | Kavuri |
| 8,195,800 B2 | 6/2012 | Tameshige et al. |
| 8,255,418 B2 | 8/2012 | Fuhry et al. |
| 8,266,406 B2 | 9/2012 | Kavuri |
| 8,306,926 B2 | 11/2012 | Prahlad |
| 8,315,981 B2 | 11/2012 | Prahlad et al. |
| 8,578,487 B2 | 11/2013 | Soeder et al. |
| 8,751,438 B2 | 6/2014 | Kharod et al. |
| 9,021,452 B2 | 4/2015 | Kripalani |
| 2002/0087633 A1* | 7/2002 | Nelson ............. G06F 17/30899 |
| | | 709/204 |
| 2003/0065759 A1 | 4/2003 | Britt et al. |
| 2004/0103088 A1* | 5/2004 | Cragun ............. G06F 17/30545 |
| 2005/0091369 A1 | 4/2005 | Jones |
| 2006/0106641 A1 | 5/2006 | Bartsch et al. |
| 2007/0203933 A1* | 8/2007 | Iversen ............. G06F 17/30592 |
| 2007/0297418 A1 | 12/2007 | Lee et al. |
| 2008/0120688 A1 | 5/2008 | Qiu et al. |
| 2009/0307283 A1* | 12/2009 | Lehr ................... G06F 11/1461 |
| 2010/0011256 A1 | 1/2010 | Nakajima et al. |
| 2010/0186020 A1 | 7/2010 | Maddhirala et al. |
| 2010/0257412 A1 | 10/2010 | Acuna et al. |
| 2010/0332453 A1* | 12/2010 | Prahlad ............. G06F 11/1458 |
| | | 707/640 |
| 2012/0117644 A1* | 5/2012 | Soeder ................ G06F 21/6227 |
| | | 726/22 |
| 2013/0042256 A1 | 2/2013 | Qian et al. |
| 2013/0054642 A1* | 2/2013 | Morin ............... G06F 17/30557 |
| | | 707/770 |
| 2013/0275360 A1* | 10/2013 | Kharod ............. G06F 17/30563 |
| | | 707/602 |
| 2014/0181085 A1 | 6/2014 | Gokhale et al. |

(56) References Cited

U.S. PATENT DOCUMENTS

| | | |
|---|---|---|
| 2015/0199265 A1 | 7/2015 | Kripalani et al. |
| 2015/0199367 A1 | 7/2015 | Hammer et al. |
| 2015/0242264 A1 | 8/2015 | Vibhor et al. |
| 2015/0244775 A1 | 8/2015 | Vibhor et al. |
| 2015/0363270 A1 | 12/2015 | Hammer et al. |

FOREIGN PATENT DOCUMENTS

| | | |
|---|---|---|
| EP | 0467546 A2 | 1/1992 |
| EP | 0774715 A1 | 5/1997 |
| EP | 0809184 A1 | 11/1997 |
| EP | 0899662 A1 | 3/1999 |
| EP | 0981090 A1 | 2/2000 |
| WO | 9513580 A1 | 5/1995 |
| WO | 9912098 A1 | 3/1999 |

OTHER PUBLICATIONS

U.S. Appl. No. 14/848,463, filed Sep. 9, 2015, Mishra, Hemant et al.

"2003 GOLD: CommVault QiNetix 4.2," SearchStorage.com, downloaded from: searchstorage.techtarget.com/news/article/0,289142,sid5 gci942854,00.html, Dec. 30, 2003, pp. 1-3.

"CommVault QiNetix: Dynamic Data Management," Product brochure downloaded from: www.stephord.com/book%5CQiNetix_Brochure.pdf, CommVault Systems, Inc., © 2003, pp. 1-6.

"CommVault QiNetix: Galaxy Backup and Recovery—Data Protection," Product brochure downloaded from: www.hitachidatasystems.com/assets/pdf/ProductTriF old_Galaxy .pdf, Comm Vault Systems, Inc., © 2002, pp. 1-5.

"CommVault QiNetix: Galaxy iDataAgent for SharePoint Portal Server," Product brochure downloaded from: directory .partners.extranet.microsoft.com/collaterai/2123/DS_GBR_MSFTSPPServer .pdf, CommVault Systems, Inc., © 2002, pp. 1-2.

Agrawal, Dakshi, et al., "Policy-Based Validation of SAN Configuration", POLICY '04, Jun. 7-9, 2004, pp. 77-86.

Armstead et al., "Implementation of a Campwide Distributed Mass Storage Service: The Dream vs. Reality," IEEE, Sep. 11-14, 1995, pp. 190-199.

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Beck, Micah, et al., "The Internet2 Distributed Storage Infrastructure Project: An Architecture for Internet Content Channels", Computer Networks and ISDN Systems, vol. 30, Issues 22-23, Nov. 1998, pp. 2141-2148.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Charlu, Daniel, "HP Hyperplex Clustering Technology", Proc. of the 1st IEEE Computer Science Workshop on Cluster Computing, Melbourne, Australia, Dec. 2-3, 1999, pp. 347-356.

Eitel, "Backup and Storage Management in Distributed Heterogeneous Environments," IEEE, Jun. 12-16, 1994, pp. 124-126.

Gait, J., "The Optical File Cabinet: A Random-Access File System for Write-Once Optical Disks," IEEE Computer, vol. 21, No. 6, pp. 11-22 (Jun. 1988).

Hirao, Tetsuhiro, et al., "Resource Management", Fujitsu Tech. J., vol. 40, No. 1, Jun. 2004, pp. 123-132.

Jander, M., "Launching Storage-Area Net," Data Communications, US, McGraw Hill, NY, vol. 27, No. 4 (Mar. 21, 1998), pp. 64-72.

Kaczmarski, M., et al., "Beyond Backup Toward Storage Management", IBM Systems Journal, vol. 42, No. 2, Apr. 2003, pp. 322-337.

Menon, Jai, et al., "IBM Storage Tank-A Heterogeneous Scalable SAN File System", IBM Systems Journal, vol. 42 No. 2, © 2003, pp. 250-267.

Rosenblum et al., "The Design and Implementation of a Log-Structured File System," Operating Systems Review SIGOPS, vol. 25, No. 5, New York, US, pp. 1-15 (May 1991).

Schultz, Nick, "QiNetix from CommVault", Computer Technology Review, Oct. 1, 2002, one page.

Supplementary European Search Report for PCT/US2005/015202, mailing date Mar. 16, 2010, 3 pages.

* cited by examiner

DATA STORAGE SYSTEM FOR ANALYSIS OF DATA ACROSS HETEROGENEOUS INFORMATION MANAGEMENT SYSTEMS

CROSS-REFERENCE TO RELATED APPLICATION(S)

The present application is a continuation of U.S. patent application Ser. No. 13/777,140, filed Feb. 26, 2013, which claims priority to and the benefit of U.S. Provisional Application No. 61/745,034, filed Dec. 21, 2012, each of which is hereby incorporated herein by reference in its entirety.

BACKGROUND

Information management systems protect and manage various types of data and metadata used by networked computing devices. The various types of data and metadata may include file server data, mail server data, network identities of the computing devices, and the status of data backup jobs. The various types of data and metadata are typically stored in data structures, e.g., databases. While databases and other data structures may provide excellent features for organizing information, the inherent format of the data, e.g., rows and columns, is not user-friendly. In other words, looking at tens, hundreds, or thousands of rows and columns of data is non-intuitive and is a challenging way for a user to perform an at-a-glance analysis of the contents of the database. As a result, various techniques have been developed for graphically representing the contents of information management system databases and other data structures. However, the commonly used techniques suffer from various shortcomings.

One example technique for graphically representing database contents includes using fixed charts or graphs. Fixed charts or graphs are those which are configured to graphically represent the exact same content over time. Fixed charts or graphs may consume a considerable amount of effort to initially format as desired, but may provide visually appealing and understandable representations of database contents. The complexity of the fixed charts or graphs may require an information technology (IT) administrator to write code in a database-friendly language to automate the process of database content extraction and graphing. Because of the time, cost, and complexity associated with changing fixed charts or graphs, making changes to the fixed charts or graphs can be inconvenient to a person without database programming skills.

Other shortcomings associated with graphically representing the contents of information management system databases includes an inability to represent information from databases that have different formats. For example, some organizations use one type or model of database or database management system for one part of a computing environment but use another type or model of database or database management system for another part of the computing environment. As a result, the databases operated by an organization may have incompatible formatting. The incompatible formatting makes it difficult to graphically represent information from both or all types or models of databases in a single graphical representation. For example, an organization may use a relational database model, e.g., a SQL database, to manage the operations of a first set of networked computing devices, but the organization may use an object-oriented database model, e.g., an Oracle database, to manage the operations of a second set of network computing devices. While the contents of the SQL database and the Oracle database may be similar, the organization of information in each type of database is different, thereby making joint graphical representation difficult.

The need exists for systems and methods that overcome the above problems, as well as systems and methods that provide additional benefits. Overall, the examples herein of some prior or related systems and methods and their associated limitations are intended to be illustrative and not exclusive. Other limitations of existing or prior systems and methods will become apparent to those of skill in the art upon reading the following Detailed Description.

DETAILED DESCRIPTION

The techniques disclosed in this document are useful, in one aspect, in solving the above-discussed problems.

The headings provided herein are for convenience only and do not necessarily affect the scope or meaning of the disclosure.

Overview

Disclosed are systems and methods for creating custom reports from content of one or more storage manager databases or other information management system databases. Information management systems having several different types of databases are herein identified as heterogeneous systems. Aspects of the system provide a single report, chart, or graph for an entire information management system, by translating or converting content from different types of databases into a uniform format.

The system may receive input from a user, via a graphical user interface (GUI), that identifies which content of which databases to query. In particular, the GUI may populate one or more drop-down menus or check box menus with table names and columns names of the databases. The user may then select which sets of information to query the databases for, without requiring the user to be able to program in a database language. The system may next determine the type of each database to be queried and may employ type-specific queries for each database query, based on the determination of the type. The system may then normalize all query results to a single database type or format, e.g., relational, so that the result may be stored and sorted by an interim database, such as an in-memory database. Then the system graphically represents the queried content according to the input selections made by the user. Advantageously, the disclosed techniques enable a system to bridge between different database types to generate system-wide graphs or charts. Furthermore, because the input from the user is received via menus in a GUI, the can generate the reports without database programming skills.

Figure 5:
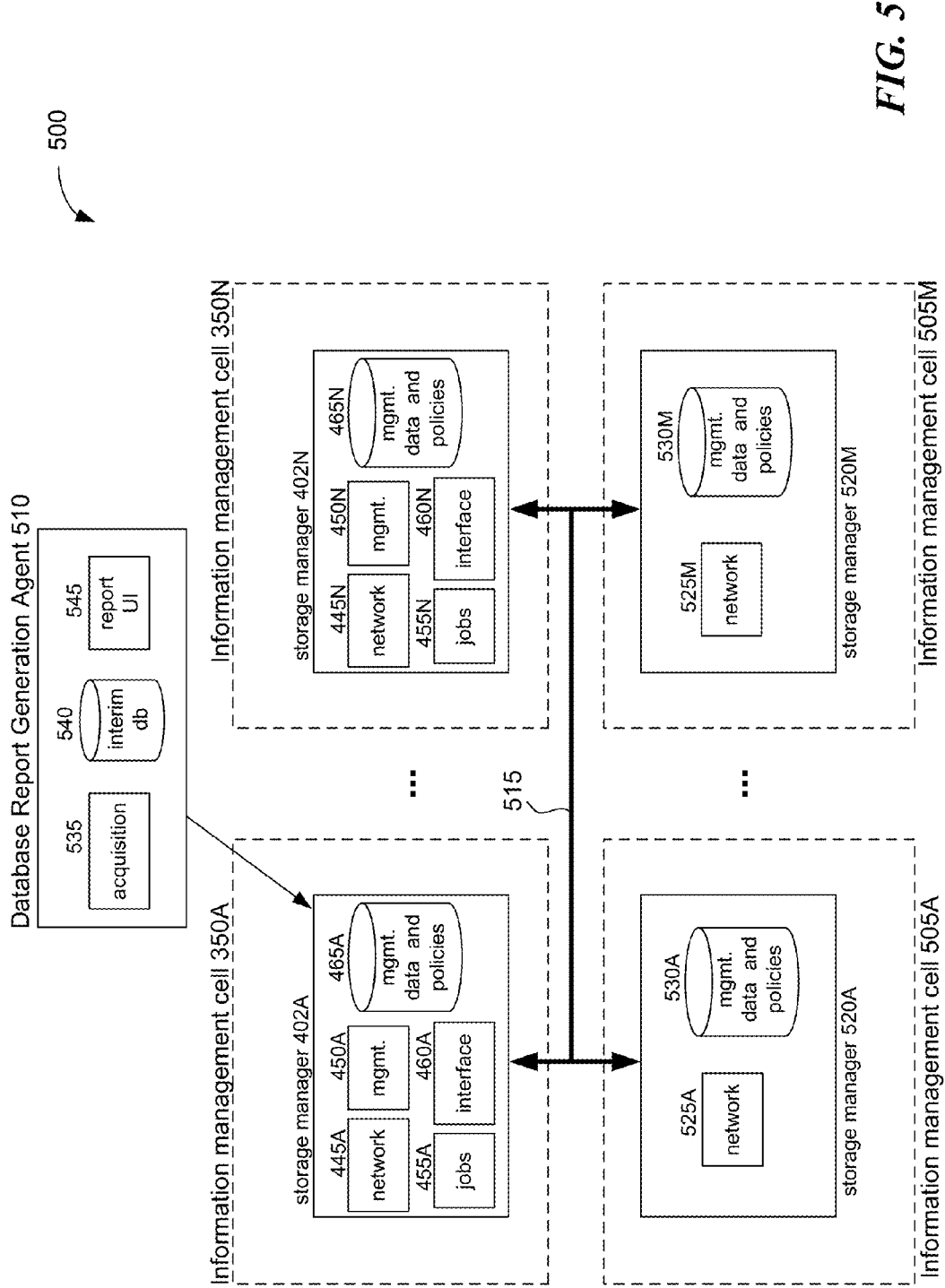
FIG. 5 is a block diagram illustrating a system for generating database reports.
Figure 6:
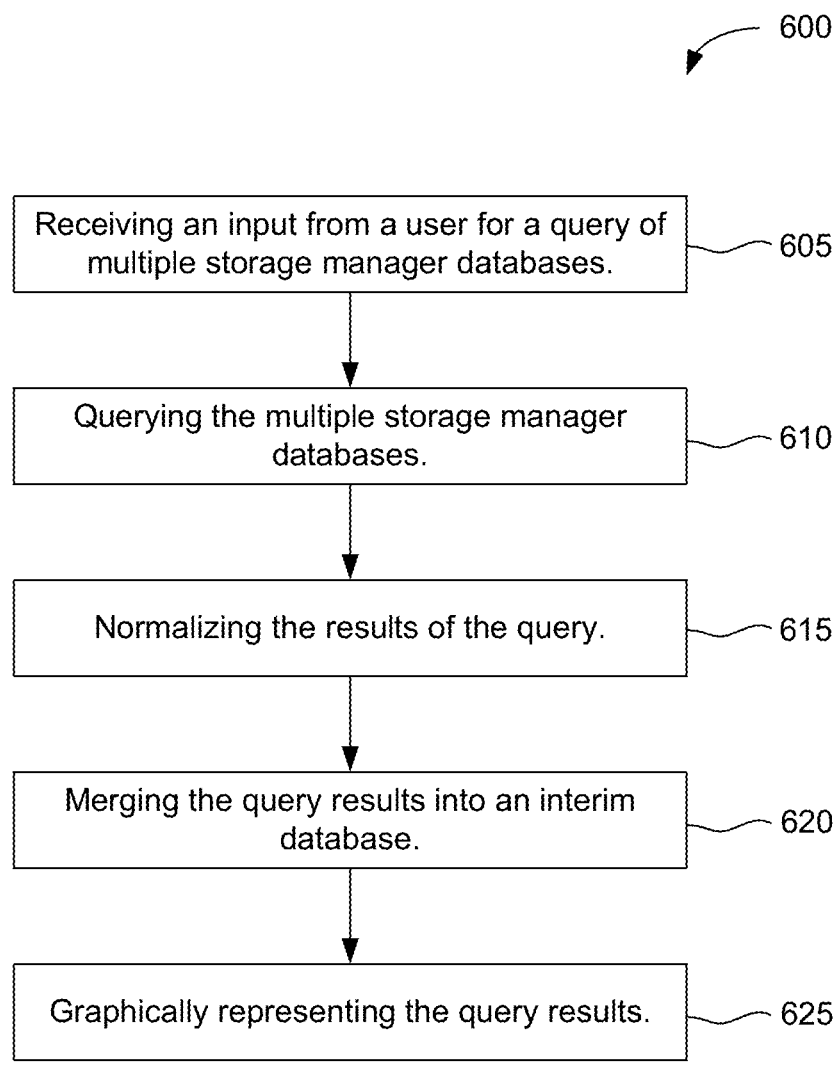
FIG. 6 is a flow chart representation of a process of generating database reports.

FIGS. 1-4 disclose foundational components and elements of an information management system and information management cell to which a customer's computing system may be upgraded. FIGS. 5-6 illustrate systems and methods of generating reports for heterogeneous information management systems. FIGS. 7-17 illustrate example GUIs, reports and methods of operating the GUIs to generate customized reports for information management systems.

Various examples of the systems and methods will now be described. The following description provides specific details for a thorough understanding and enabling description of these examples. One skilled in the relevant art will understand, however, that the invention may be practiced without many of these details. Likewise, one skilled in the relevant art will also understand that the invention may include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Information Management Environment

Figure 1:
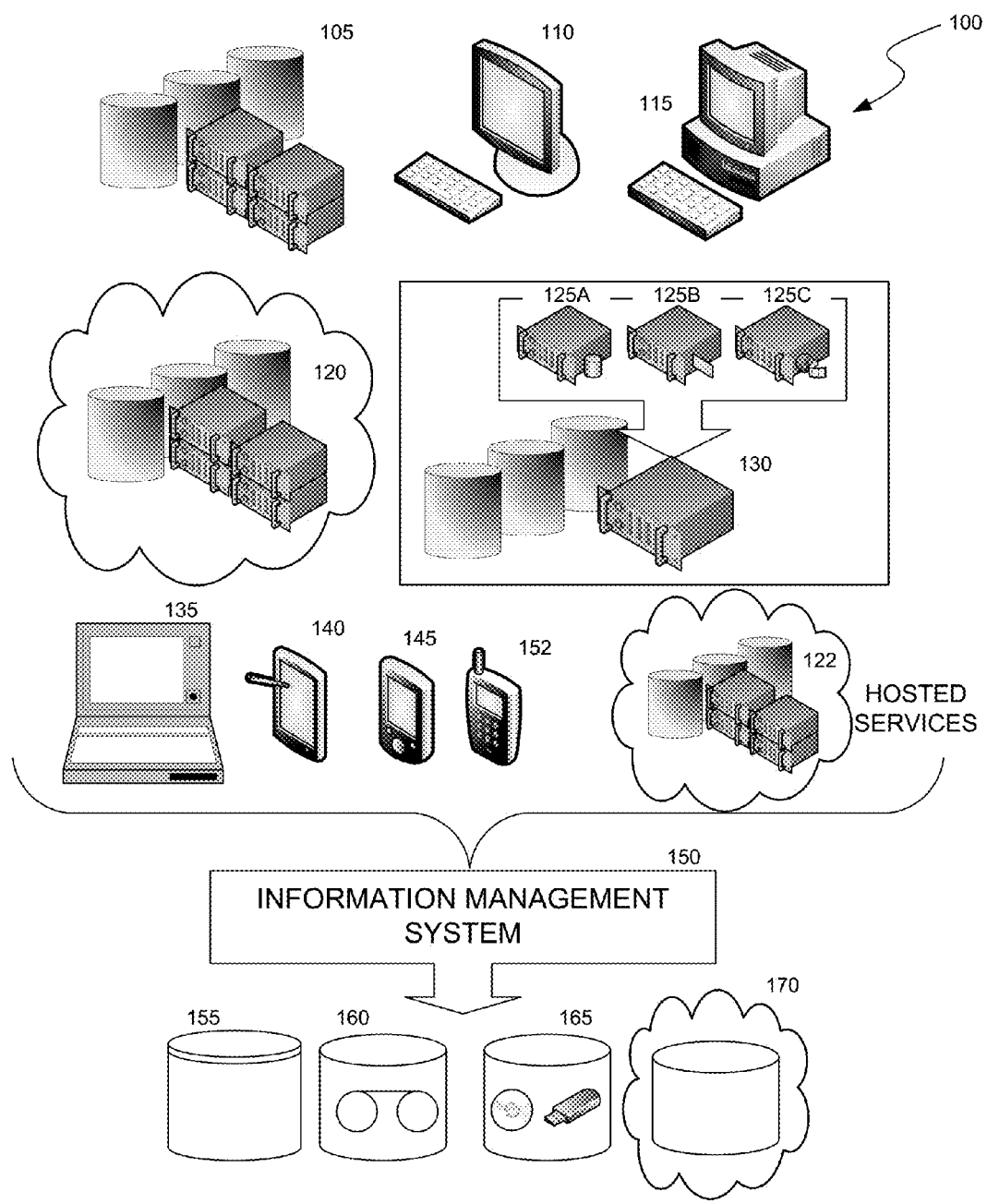
FIG. 1 is a block diagram illustrating an example of a suitable information management environment in which aspects of the inventive system may operate.

Aspects of the technologies described herein may be practiced in an information management environment 100, which will now be described while referencing FIG. 1. Aspects of the information management environment 100 may be used to generate custom reports from the content of one or more information management databases. As shown in FIG. 1, the environment 100 includes multiple computing devices that execute numerous software applications to facilitate the operations of an organization (or multiple affiliated organizations), such as a household, corporation or other business entity, a non-profit organization, an educational institution, or a governmental agency. The computing devices may include one or more: servers 105 (such as mail servers, file servers, database servers, print servers, and web servers), personal computers 110, workstations 115, or other types of fixed computing systems such as mainframe computers and minicomputers (not shown). The servers 105 may include network-attached storage (NAS) filers.

The environment 100 may include virtualized computing resources, such as a virtual machine 120 provided to the organization by a third-party cloud service vendor or a virtual machine 125 running on a virtual machine host 130 operated by the organization. For example, the organization may use one virtual machine 125A as a database server and another virtual machine 125B as a mail server. The environment 100 may also include mobile or portable computing devices, such as laptops 135, tablet computers 140, personal data assistants 145, mobile phones 152 (such as smartphones), and other mobile or portable computing devices such as embedded computers, set top boxes, vehicle-mounted devices, wearable computers, etc.

Of course, other types of computing devices may form part of the environment 100. As part of their function, each of these computing devices creates, accesses, modifies, writes, and otherwise uses production copies of data and metadata that are typically stored in a persistent storage medium having fast I/O times. For example, each computing device may regularly access and modify data files and metadata stored on semiconductor memory, a local disk drive or a network-attached storage device. Each of these computing devices may access data and metadata via a file system supported by an operating system of the computing device.

The environment 100 may also include hosted services 122 that provide various online services to the organization or its constituent members (e.g., the organization's departments, employees, independent contractors, etc.) such as social networking services (e.g., Facebook, Twitter, Pinterest), hosted email services (e.g., Gmail, Yahoo Mail, Hotmail), or hosted productivity applications or other hosted applications (e.g., Microsoft Office 365, Google Docs, Salesforce.com). Hosted services may include software-as-a-service (SaaS), platform-as-a-service (PaaS), application service providers (ASPs), cloud services, and all manner of delivering computing or functionality via a network. As it provides services to users, each hosted service may generate additional "hosted data and metadata" that is associated with each user. For example, Facebook may generate and store photos, wall posts, notes, videos, and other content that are associated with a particular Facebook user's account.

The organization directly or indirectly employs an information management system 150 to protect and manage the data and metadata used by the various computing devices in the environment 100 and the data and metadata that is maintained by hosted services on behalf of users associated with the organization. One example of an information management system is the CommVault Simpana system, available from CommVault Systems, Inc. of Oceanport, N.J. The information management system creates and manages non-production copies of the data and metadata to meet information management goals, such as: permitting the organization to restore data, metadata or both data and metadata if an original copy of the data/metadata is lost (e.g., by deletion, corruption, or disaster, or because of a service interruption by a hosted service); allowing data to be recovered from a previous time; complying with regulatory data retention and electronic discovery ("e-discovery") requirements; reducing the amount of data storage media used; facilitating data organization and search; improving user access to data files across multiple computing devices and/or hosted services; and implementing information lifecycle management ("ILM") or other data retention policies for the organization. The information management system 150 may create the additional non-production copies of the data and metadata on any suitable non-production storage medium such as magnetic disks 155, magnetic tapes 160, other storage media 165 such as solid-state storage devices or optical disks, or on cloud data storage sites 170 (e.g. those operated by third-party vendors). Further details on the information management system may be found in the assignee's U.S. patent application Ser. No. 12/751,850, filed Mar. 31, 2010 entitled DATA OBJECT STORE AND SERVER FOR A CLOUD STORAGE ENVIRONMENT, INCLUDING DATA DEDUPLICATION AND DATA MANAGEMENT ACROSS MULTIPLE CLOUD STORAGE SITES, now U.S. Pat. No. 8,285,681, which is hereby incorporated herein by reference in its entirety.

Figure 2:
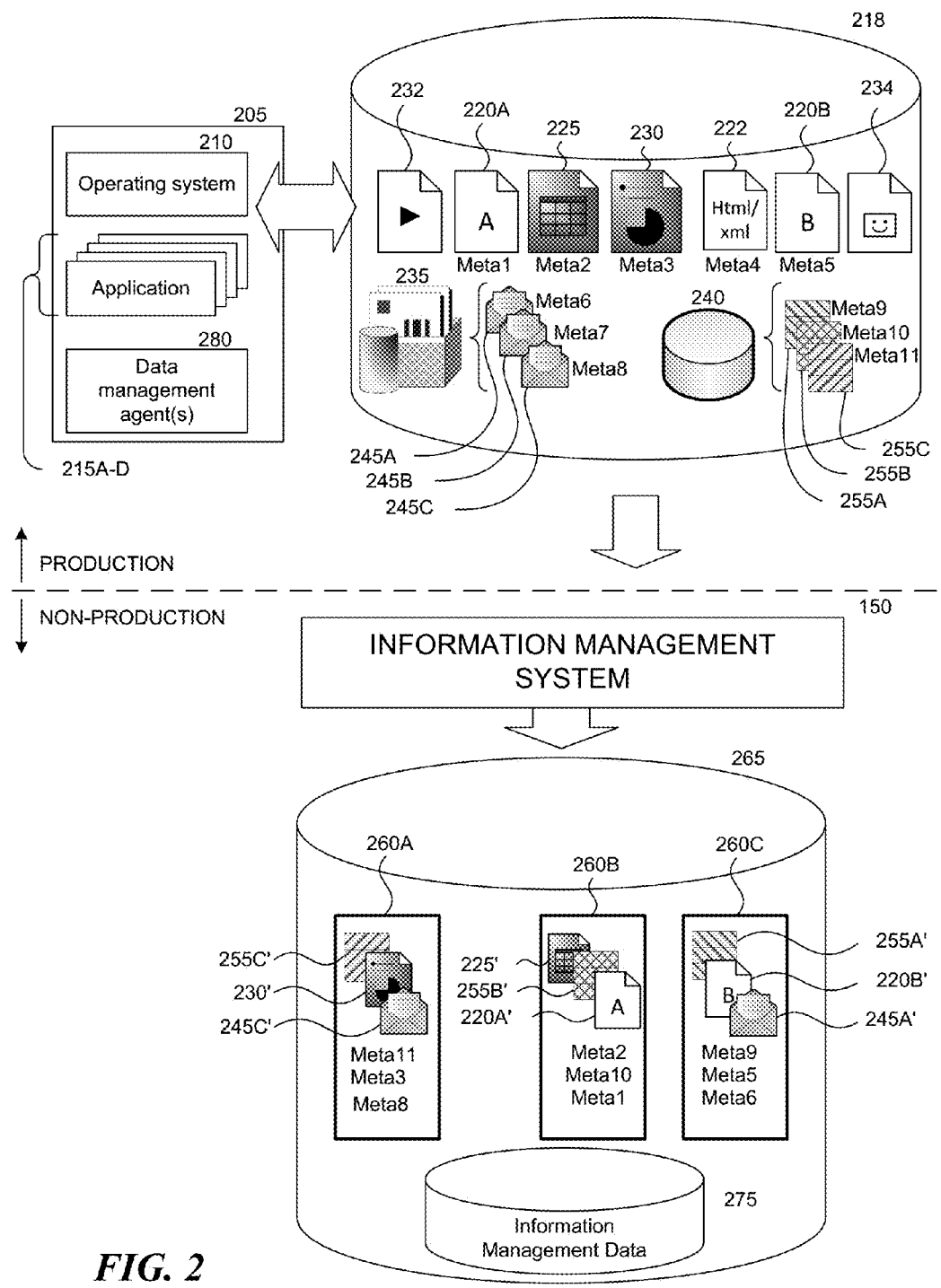
FIG. 2 illustrates examples of production and non-production data that may be processed by the information management environment of FIG. 1.

FIG. 2 helps illustrates some differences between "production copies" of data and metadata and "non-production copies" of data and metadata in the data management environment 100. As shown, each computing device 205 in the environment 100 has at least one operating system 210 installed and one or more applications 215A-D, such as mail server applications, file server applications, mail client applications, database applications, word processing applications, spreadsheet applications, presentation applications, browser applications, mobile applications, entertainment applications, and so on. Each application can access and modify various production copies of files stored in a production data storage medium 218, which may be a network attached storage filer or form part of a Hadoop distributed file system, Open VMS file system, or other type of distributed file system, simply by making conventional file system calls via the operating system 210, without needing the information management system 150 to intervene on behalf of the operating system or application. The production copies of files may include structured data (e.g., database files), unstructured data (e.g., documents), and/or semi-structured data, and thus may include one or more documents 220A-B, spreadsheets 225, presentation documents 230, video files 232, image files 234, email mailboxes 235, html/xml or other types of markup language files 222, and/or databases 240. The operating system 210 may also access and modify production copies of files and other data, such as files in a system volume and/or boot volume. The hosted data and metadata used by a hosted service are also "production copies" of data and metadata since the hosted service accesses and modifies the user's data and metadata as part of its services. Production copies of data may include not only files, but also subsets of files, each of which a related application 215 or the operating system 210 treats as an independent functional unit, but which is not separately addressed in the associated file system. For example, a single email mailbox 235 may include multiple email messages 245A-C, email headers, and attachments. As another example, a single database 240 may include multiple tables 255A-C. As used herein, a "data object" refers to both (1) any file that is currently or previously addressable by a file system and (2) a functional subset of such a file that has a particular function for a related application 215A-D or the operating system 210. Each data object may be further decomposed into one or more data blocks each of which is a collection of data bits within the data object that may not have any particular function for a related application or the operating system. In addition to data objects, the operating system 210 and applications 215A-D may also access and modify production copies of metadata, such as boot sectors, partition layouts, file or data object metadata (e.g., file name, file size, creation/modification/access timestamps, file location within a file folder directory structure, user permissions, owners, groups, access control lists ("ACLs")), and system metadata (e.g., registry information). In addition to metadata generated by or related to file systems and operating systems, some applications maintain indices of production metadata for data objects, e.g., metadata associated with individual email messages. Thus, as shown in FIG. 2, each data object may be associated with a production copy of object metadata ("Meta1-11"), which may be file system metadata and/or application-specific metadata.

The information management system 150 accesses or receives copies of the various production copies of data objects and metadata, and via an information management operation (such as a backup operation, archive operation, or snapshot operation), creates non-production copies of these data objects and metadata, often stored in one or more non-production storage mediums 265 different than the production storage medium 218 where the production copies of the data objects and metadata reside. A non-production copy of a data object represents the production data object and its associated metadata at a particular point in time (non-production objects 260A-C). Since a production copy of a data object or metadata changes over time as it is modified by an application 215, hosted service 122, or the operating system 210, the information management system 150 may create and manage multiple non-production copies of a particular data object or metadata, each representing the state of the production data object or metadata at a particular point in time. Moreover, since a production copy of a data object may eventually be deleted from the production data storage medium and the file system from which it originated, the information management system may continue to manage point-in-time representations of that data object, even though a production copy of the data object itself no longer exists.

For virtualized computing devices, such as virtual machines, the operating system 210 and applications 215A-D may be running on top of virtualization software, and the production data storage medium 218 may be a virtual disk created on a physical medium such as a physical disk. The information management system may create non-production copies of the discrete data objects stored in a virtual disk file (e.g., documents, email mailboxes, and spreadsheets) and/or non-production copies of the entire virtual disk file itself (e.g., a non-production copy of an entire .vmdk file).

Each non-production object 260A-C may contain copies of or otherwise represent more than one production data object. For example, non-production object 260A represents three separate production data objects 255C, 230 and 245C (represented as 245C', 230' and 245', respectively). Moreover, as indicated by the prime mark ('), a non-production object may store a representation of a production data object or metadata differently than the original format of the data object or metadata, e.g., in a compressed, encrypted, deduplicated, or otherwise optimized format. Although FIG. 2 shows that a single production data object (e.g., 255C), and its associated data object metadata (e.g., Meta11) are represented by the contents of only a single non-production object (e.g., 260A), the entire contents of a single production data object and/or its metadata at a particular point in time may instead span across numerous non-production objects. Also a single non-production object 260 may contain copies of or otherwise represent production data objects that originated from different computing devices.

Non-production copies include backup copies, archive copies, and snapshot copies. Backup copies are generally used for shorter-term data protection and restoration purposes and may be in a native application format or in a non-native format (e.g., compressed, encrypted, deduplicated, and/or otherwise modified from the original application format). Archive copies are generally used for long-term data storage purposes and may be compressed, encrypted, deduplicated and/or otherwise modified from the original application format. In some examples, when an archive copy of a data object is made, a logical reference or stub may be used to replace the production copy of the data object in the production storage medium 218. In such examples, the stub may point to or otherwise reference the archive copy of the data object stored in the non-production storage medium so that the information management system can retrieve the archive copy if needed. The stub may also include some metadata associated with the data object, so that a file system and/or application can provide some information about the data object and/or a limited-functionality version (e.g., a preview) of the data object. A snapshot copy represents a data object at a particular point in time. A snapshot copy can be made quickly and without significantly impacting production computing resources because large amounts of data need not be copied or moved. A snapshot copy may include a set of pointers derived from the file system or an application, where each pointer points to a respective stored data block, so collectively, the set of pointers reflect the storage location and state of the data object at a particular point in time when the snapshot copy was created. In "copy-on-write", if a block of data is to be deleted or changed, the snapshot process writes the block to a particular data storage location, and the pointer for that block is now directed to that particular location. The set of pointers and/or the set of blocks pointed to by a snapshot may be stored within the production data storage medium 218.

Non-production copies of a data object or metadata may be distinguished from a production copy of a data object or metadata in several ways. First, a non-production copy of a data object is created to meet the different information management goals described above and is not directly used or modified by applications 215A-D, hosted services 122, or the operating system 210. Second, a non-production copy of a data object is stored as one or more non-production objects 260 that may have a format different from the native application format of the production copy of the data object, and thus often cannot be directly used by the native application or a hosted service 122 without first being modified. Third, non-production objects are often stored on a non-production storage medium 265 that is inaccessible to the applications 215A-D running on computing devices and hosted services 122. Also, some non-production copies may be "offline copies," in that they are not readily available (e.g. not mounted tape or disk.) Offline copies include copies of data that the information management system can access without any human intervention (e.g. tapes within an automated tape library, but not yet mounted in a drive), and copies that the information management system 150 can access only with at least some human intervention (e.g. tapes located at an offsite storage site).

The information management system 150 also generates information management data 275, such as indexing information, that permit the information management system to perform its various information management tasks. As shown in FIG. 2, a computing device 205 may include one or more data management agents 280 that provide client-side functions for the information management system.

Information Management System

Figure 3:
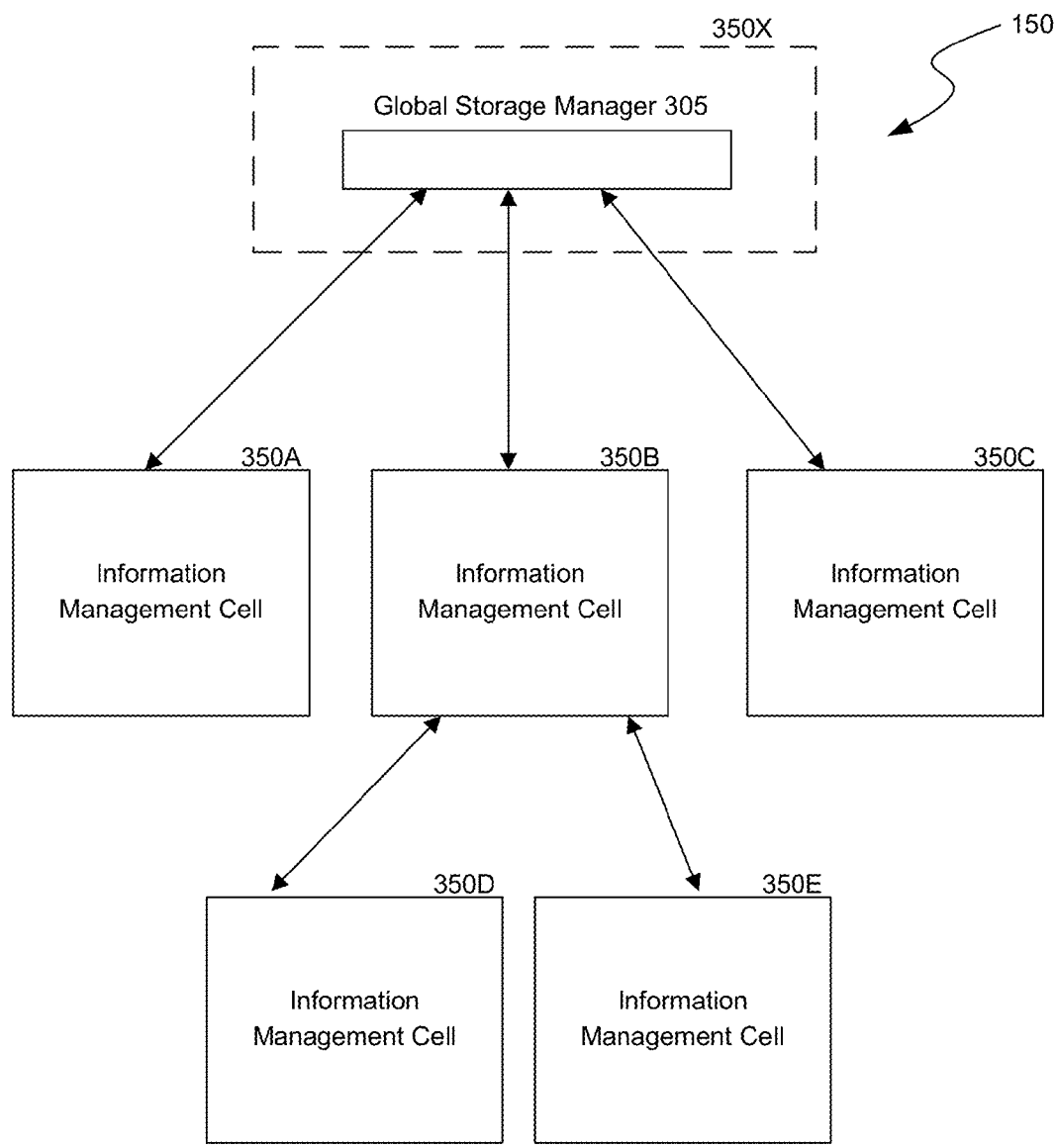
FIG. 3 is a block diagram illustrating one example of a hierarchical arrangement of resources for the information management system of FIG. 1, including information management cells.

FIG. 3 shows a hierarchical arrangement of resources that may form an information management system 150. As shown, the information management system 150 includes multiple information management cells 350 arranged in a hierarchy, with some information management cells (e.g., 350D-E) subordinate to other information management cells (e.g., 350B). A global storage manager 305, which may form part of a global information cell 350x, manages the overall hierarchy of information management cells by receiving reports from the various subordinate information management cells related to the operation of the cells, determining global information management policies in light of received reports, and pushing information management policies towards subordinate cells for implementation. The global storage manager may also maintain and disseminate, to the various cells, system-wide information management data. A superior information management cell (e.g., 350B), may perform similar tasks for its subordinate cells (e.g., 350D-E) and/or otherwise act as an intermediary between the subordinate cells and the global storage manager 305.

Information Management Cell

Figure 4:
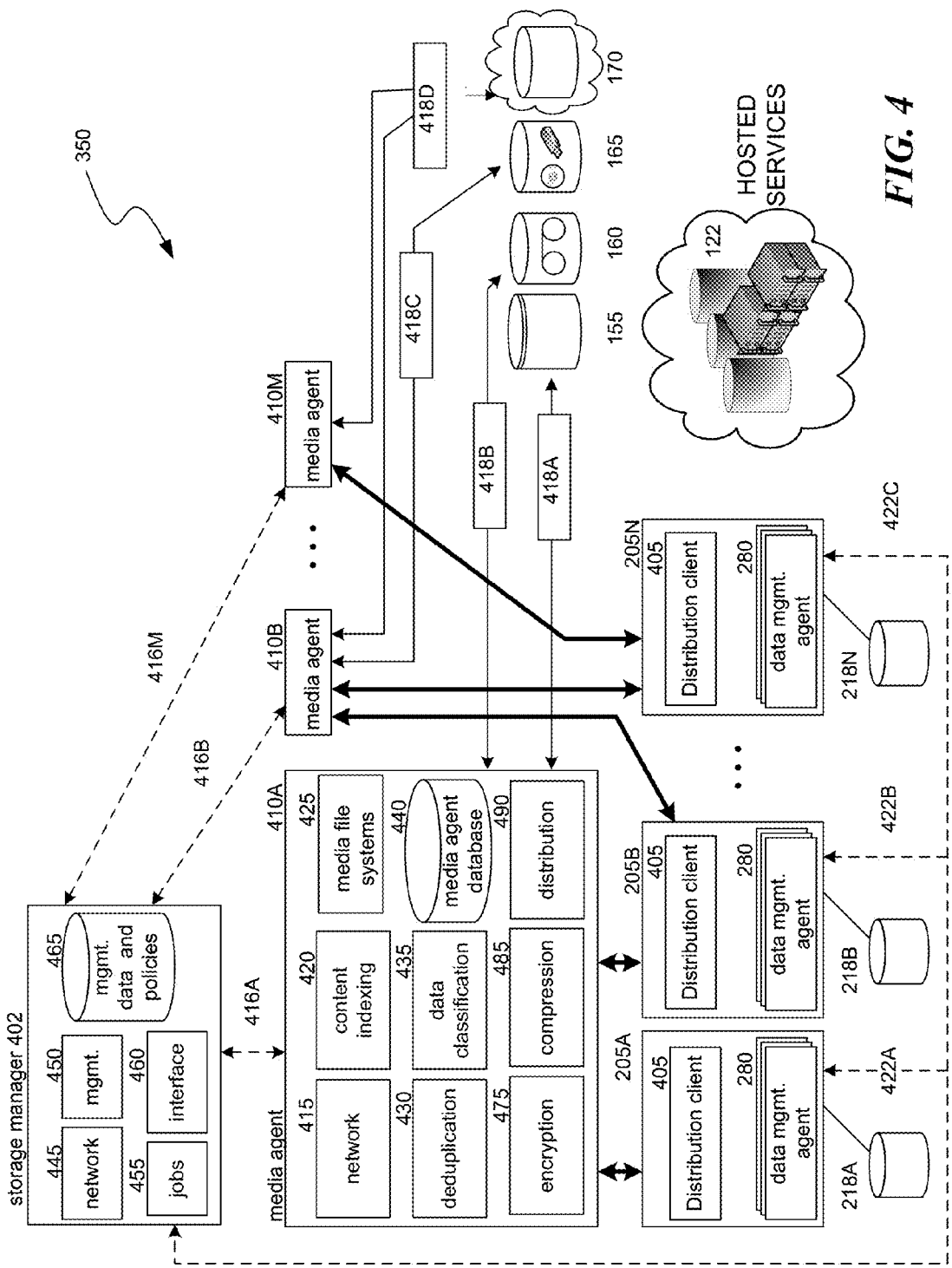
FIG. 4 is a block diagram illustrating an example of resources forming an information management cell.

FIG. 4 shows an arrangement of resources that may be used to build and display customizable database reports and that may form an information management cell 350. As shown, the information management cell includes a storage manager 402, one or more media agents 410A-M, one or more non-production storage mediums 155-170, one or more computing devices 205A-N, and one or more production data storage mediums 218A-N. Outside of the information management cell are hosted services 122, which may interact with media agents 410 and its components, as described further herein. In some examples, all or a portion of an information management cell may be implemented as an object store, as described in assignee's U.S. patent application Ser. No. 12/751,850 (introduced above).

The storage manager 402 may be a software module or other application that coordinates and controls information management operations performed by one or more information management cells 350 to protect and control copies of non-production data objects and metadata. As shown by the dashed lines 416 and 422, the storage manager may communicate with some or all elements of the information management cell 350, such as the media agents 410 and computing devices 205, to initiate and manage backup operations, snapshot operations, archive operations, data replication operations, data migrations, data distributions, data recovery, and other information management operations. The storage manager may control additional information management operations including ILM, deduplication, content indexing, data classification, data mining or searching, e-discovery management, collaborative searching, encryption, and compression. Alternatively or additionally, a storage manager may control the creation and management of disaster recovery copies, which are often created as secondary, high-availability disk copies, using auxiliary copy or replication technologies.

The storage manager 402 may include a jobs agent 455, a management agent 450, a network agent 445, and an interface agent 460, all of which may be implemented as interconnected software modules or application programs. The jobs agent 455 monitors the status of information management operations previously performed, currently being performed, or scheduled to be performed by the information management cell 350. The management agent 450 provides an interface that allows various management agents 450 in multiple information management cells 350

(or in a global storage manager 305) to communicate with one another. This allows each information management cell 350 to exchange status information, routing information, capacity and utilization information, and information management operation instructions or policies with other cells. In general, the network agent 445 provides the storage manager 402 with the ability to communicate with other components within the information management cell and the larger information management system, e.g., via proprietary or non-proprietary network protocols and application programming interfaces ("APIs") (including HTTP, HTTPS, FTP, REST, virtualization software APIs, cloud service provider APIs, hosted service provider APIs). The interface agent 460 includes information processing and display software, such as a graphical user interface ("GUI"), an API, or other interactive interface through which users and system processes can retrieve information about the status of information management operations or issue instructions to the information management cell and its constituent components. The storage manager 402 may also track information that permits it to select, designate, or otherwise identify content indices, deduplication databases, or similar databases within its information management cell (or another cell) to be searched in response to certain queries.

The storage manager 402 may also maintain information management data, such as a database 465 of management data and policies. The database 465 may include a management index that stores logical associations between components of the system, user preferences, user profiles (that among other things, map particular information management users to computing devices or hosted services), management tasks, or other useful data. The database 465 may also include various "information management policies," which are generally data structures or other information sources that each include a set of criteria and rules associated with performing an information management operation. The criteria may be used to determine which rules apply to a particular data object, system component, or information management operation, an may include:
  frequency with which a production or non-production copy of a data object or metadata has been or is predicted to be used, accessed, or modified;
  access control lists or other security information;
  the sensitivity (e.g., confidentiality) of a data object as determined by its content and/or metadata;
  time-related factors;
  deduplication information;
  the computing device, hosted service, computing process, or user that created, modified, or accessed a production copy of a data object; and
  an estimated or historic usage or cost associated with different components.
The rules may specify, among other things:
  a schedule for performing information management operations,
  a location (or a class or quality of storage media) for storing a non-production copy,
  preferences regarding the encryption, compression, or deduplication of a non-production copy,
  resource allocation between different computing devices or other system components (e.g., bandwidth, storage capacity),
  whether and how to synchronize or otherwise distribute files or other data objects across multiple computing devices or hosted services,
  network pathways and components to utilize (e.g., to transfer data) during an information management operation, and
  retention policies (e.g., the length of time a non-production copy should be retained in a particular class of storage media).

As noted above, each computing device 205 may include one or more data management agents 280. Each data management agent 280 is a software module or component that helps govern communications with other system components. For example, the data management agent receives commands from the storage manager 402 and sends to and receives from media agents 410 copies of data objects, metadata, and other payload (as indicated by the heavy arrows). Each data management agent accesses data and/or metadata stored in a production data storage medium 218 and arranges or packs the data and metadata in a certain format (e.g., backup or archive format) before it is transferred to another component. Each data management agent can also restore a production copy of a data object or metadata in a production data storage medium 218 from a non-production copy. A data management agent may perform some functions provided by a media agent, which are described further herein, such as compression, encryption, or deduplication. Each data management agent may be specialized for a particular application (e.g. a specified data management agent customized to handle data generated or used by Exchange by Microsoft Corp.). Alternatively or additionally, a more generic data management agent may handle data generated or used by two or more applications.

Each computing device 205 may also include a data distribution and live browsing client module 405 (herein "distribution client module"). The distribution client module 405 is responsible for, inter alia, associating mobile devices and/or hosted service accounts with users of the information management system, setting information management policies for mobile and other computing devices, pushing data objects to a distribution module for distribution to other computing devices, providing unified access to a user's data via an interface, and providing live browsing features. The various functions of the distribution client module are described in greater detail herein.

A media agent 410, which may be implemented as a software module, conveys data, as directed by the storage manager 402, between a computing device 205 (or hosted service 122) and one or more non-production storage mediums 155-170. Each media agent 410 may control one or more intermediary storage devices 418, such as a cloud server or a tape or magnetic disk library management system, to read, write, or otherwise manipulate data stored in a non-production storage medium 155-170. Each media agent 410 may be considered to be "associated with" a storage device and its related non-production storage media if that media agent is capable of routing data to and storing data in the storage media managed by the particular storage device. A media agent may communicate with computing devices 205, hosted services 122, storage devices 418A-D, and the storage manager 402 via any suitable communications path, including SCSI, a Storage Area Network ("SAN"), a Fibre Channel communications link, or a wired, wireless, or partially wired/wireless computer or telecommunications network, including the Internet.

To perform its functions, the media agent 410 may include a media file system module 425, a data classification module 435, a content indexing module 420, a deduplication module 430, an encryption module 475, a compression module 485, a network module 415, a distribution module 490, and a media agent database 440. The media file system module 425 is responsible for reading, writing, archiving, copying, migrating, restoring, accessing, moving, sparsifying, deleting, sanitizing, destroying, or otherwise performing file system operations on various non-production storage devices of disparate types. The media file system module may also instruct the storage device to use a robotic arm or other retrieval means to load or eject certain storage media such as a tape.

The network module 415 permits the media agent to communicate with other components within the system and hosted services 122 via one or more proprietary and/or non-proprietary network protocols or APIs (including cloud service provider APIs, virtual machine management APIs, and hosted service provider APIs). The deduplication module 430 performs deduplication of data objects and/or data blocks to reduce data redundancy in the cell. The deduplication module may generate and store data structures to manage deduplicated data objects, such as deduplication tables, in the media agent database 440. The encryption module 475 performs encryption of data objects, data blocks, or non-production objects to ensure data security in the cell. The compression module 485 performs compression of data objects, data blocks, or non-production objects to reduce the data capacity needed in the cell.

The content indexing module 420 analyzes the contents of production copies or non-production copies of data objects and/or their associated metadata and catalogues the results of this analysis, along with the storage locations of (or references to) the production or non-production copies, in a content index stored within a media agent database 440. The results may also be stored elsewhere in the system, e.g., in the storage manager 402, along with a non-production copy of the data objects, and/or an index cache. Such index data provides the media agent 410 or another device with an efficient mechanism for locating production copies and/or non-production copies of data objects that match particular criteria. The index data or other analyses of data objects or metadata may also be used by the data classification module 435 to associate data objects with classification identifiers (such as classification tags) in the media agent database 440 (or other indices) to facilitate information management policies and searches of stored data objects.

The distribution module 490 may be a set of instructions that coordinates the distribution of data objects and indices of data objects. The distribution may occur from one computing device 205 to another computing device 205 and/or from hosted services 122 to computing devices 205. As a first example, the distribution module may collect and manage data and metadata from hosted services 122 or mobile devices 205. As another example, the distribution module may synchronize data files or other data objects that are modified on one computing device so that the same modified files or objects are available on another computing device. As yet another example, the distribution module may distribute indices of data objects that originated from multiple computing devices and/or hosted services, so a user can access all of their data objects through a unified user interface or a native application on their computing device. The distribution module may also initiate "live browse" sessions to permit communications between different computing devices so that the devices can interchange data and metadata or so the devices can provide computing resources, such as applications, to each other. The functions performed by the distribution module are described in greater detail herein.

Heterogeneous Database Report Generation

In its native format, a database does not provide a user-friendly representation of its contents. A database is a structured collection of data that may comprise columns and rows of data grouped into tables, or may be organized as many other types of data structures. Organizations use a database to bring independent sources of data together and to store them electronically. The database typically groups the independent sources of data with a logical association, e.g., a key, to enable the organizations to selectively and quickly retrieve portions of the stored data. The database enables retrieval of portions of the stored data based on the type, use, or association of the data. As an example, in FIG. 4, the database 465 groups information about non-production storage devices 155-170 together with information about client devices 205 to enable a user to retrieve information about secondary copies of data that are presently stored on non-production storage devices 155-170 for the client devices 205. Even though databases are useful for storing and retrieving information, rows and columns of data are not a user-friendly or analysis-friendly format for information.

IT administrators can query a database and program a graphical representation of the contents of a single database, but, as discussed in the Background, creating a graphical representation of different types or models of databases can be difficult. Databases are functionally grouped into types or models. A database model is generally a theoretical foundation of a database and fundamentally determines the manner in which data can be stored, organized, and manipulated in the database system. The database model (or type) defines the infrastructure offered by a particular database system. Examples of models of databases or database management systems include extensive markup language (XML) databases, networked databases, distributed databases, hierarchical databases, relational databases, document-oriented databases, and object-oriented databases. Because each type of database model has particular strengths, an organization may employ multiple types of databases within a single networked computing system, such as within the information management system 150 (shown in FIG. 3). In particular, an organization may employ a first type of database in a first information management cell and may employ a second type of database in a second information management cell. It can therefore be challenging for the organization to generate reports for the entire networked computing system, i.e., both the first and second information management cells, because a common query to both of the different types of databases will return different or incompatible query results. Furthermore, both types of the databases may not even recognize a common query command. The following systems and methods provide solutions to the problem of generating reports from heterogeneous information management system databases, i.e., databases of different types (as well as providing other benefits).

FIG. 5 illustrates a computing environment 500 having a database report generation agent that is executable by one or more heterogeneous information management cells. As used herein, "heterogeneous information management cells" include information management cells having differing types of database management systems, e.g., object-oriented, document-oriented, or relational databases. The database report generation agent enables an information management cell to acquire and normalize database content to display graphical representations of the content. The database content may be from storage manager databases from two or more heterogeneous information management cells. Advantageously, the database report generation agent enables a user to concurrently operate different types of database management systems for a single organization and still generate system-wide graphical representations of the contents of the databases. Without the database report generation agent, an organization may be limited to settling for one report for each type of database or be limited to one report for each information management cell.

The computing environment 500 includes information management cells 350, information management cells 505, and a database report generation agent 510 ("report agent 510"). The information management cells 350 are communicatively coupled, i.e. connected, to the information management cells 505 via a network connection 515. The network connection 515 may be a LAN, WAN, or other type of network connection. The information management cells 350 may include storage manager databases of a first type of database management system. The information management cells 505 may include storage manager databases of a second type of database management system that is different from the first type of database management system. Accordingly, the computing environment 500 may include heterogeneous information management cells 350 and 505 because the storage manager databases are of different types of database management systems.

The information management cells 350 can be the information management cells 350 from the information management system 150 that is illustrated in FIG. 3. The information management cells 350 may include two or more information management cells 350A-N. Each of the information management cells 350 include corresponding storage managers 402 (inclusive of storage managers 402A-N). As discussed above in connection with FIG. 4, the storage managers 402 may each include a database 465 having data and metadata associated with one or more information management cells 350. According to one implementation, the storage managers 402A-N create and maintain a uniform type of database management systems for each of the databases 465A-N. For example, each database 465A-N is implemented with a relational database management system such as structured query language (SQL) database. More specifically, the databases 465 may be implemented with Microsoft SQL (MS SQL) or MySQL database management systems.

The information management cells 505 are communicatively coupled or connected to the information management cells 350 but may include storage managers 520 that operate differently than storage managers 402 and that are configured differently than storage managers 402. In particular, the storage managers 520 may execute information management software products that are different than the information management software products used to implement the storage managers 402, e.g., a CommVault® software product. For example, the storage managers 520 may instead execute information management software products from other manufacturers, such as Networker® software by EMC2®, NetBackup™ software by Symantec™, Tivoli Storage Manager FastBack® software by IBM®, and the like.

Each of the storage managers 520A-M may execute a network module 525A-M and maintain a database 530A-M. The network module 525A enables the storage manager 520A to communicate with other information management cells 505M, 350A-N and with other storage managers 520M and 402A-N. In some implementations, the network module 525A may include instructions that enable the storage manager 520A to utilize one or more communications protocols such as TCP/IP, or the like.

The databases 530 may enable the storage managers 520 to manage and maintain data and metadata associated with computing devices networked within the information management cells 505. In some implementations, the databases 530 are implemented in types of database management systems that are different than the type of database management system used for the databases 465. For example, if the databases 465 are implemented in relational database management systems, then the databases 530 may be implemented by one or more non-relational, i.e., non-SQL, types of database management systems. Examples of non-relational database management systems include MongoDB, Oracle, NoSQL, BaseX, Clusterpoint, eXist, Jackrabbit, OrientDB, Sedna, SimpleDB, or the like. Table 1, illustrated below, includes several commonly used examples of databases management systems with the corresponding

TABLE 1

| Name | Type or Description |
|---|---|
| MySQL | Relational Database Management System |
| MS SQL | Relational Database Management System |
| IMS | Hierarchical Database Management System |
| Honeywell IDS | Network Database Management System |
| TurboIMAGE | Network Database Management System |
| MongoDB | Document-oriented Database Management System |
| Oracle | Object-relational Database Management System |
| eXist | XML Database Management System |
| OrientDB | Document-based Database Management System w/SQL support |
| SimpleDB | Distributed Database Management System |
| Sedna | XML Database Management System | types or descriptions of the databases. As shown, various vendors and various types of database management systems are available.

As discussed above, each type of database management system organizes stored information differently than each other type. As result, queries to each of the different types produce results with different content. For example, a query to a relational database, e.g., to a MySQL database, may return a field, i.e., an item of data. By contrast, a query to a document-oriented database, e.g., MongoDB, may return an object having a piece of data and instructions for what to do with the data. The object returned by the MongoDB may be used to retrieve its associated data (which may be similar to the field returned by the relational database query). However, some translation and additional processing is typically needed in order to retrieve similar information from the different types of database management systems.

The storage manager 402A may execute the report agent 510 to acquire content from multiple databases, to merge the acquired content, and to graphically display the content in a single graph or chart. The report agent 510 is special in that it enables the storage manager 402A to generate a report based on the content of databases from more than one information management cell. The report agent 510 is further special in that it also enables the storage manager 402A to generate a report based on the content of heterogeneous databases, i.e., information management system databases of different types. The report agent 510 may use an acquisition module 535, an interim database 540, and a report user interface (UI) module 545 to perform its functions.

The acquisition module 535 enables the storage manager 402A to acquire information from two or more databases 465 and 530. As an illustrative example, the storage manager 402A executes the acquisition module 535 to acquire portions of the content of the database 530M. The acquisition module 535 receives network address information, database identification, and security credentials from a user in order to access the database 530M. In some implementations, network address information, database identification, security credentials are received from the user through report user interface module 545. The acquisition module 535 may use the network module 445A to communicate, via one or more network protocols, with the network module 525M in order to authenticate the communications between the storage manager 402A and the storage manager 520M and to retrieve portions of the database 530M.

The acquisition module 535 determines what type of database the database 530M is categorized under. The acquisition module 535 may receive type information for the database 530M from the user, via the report user interface module 545. Alternatively, the acquisition module 535 may look up the type of the database 530M by using Table 1 combined with the name of the database 530M that was received from the user. In one implementation, the acquisition module uses network address information received from the user to communicate with the database 530M and to acquire the type of the database 530M directly from the database 530M.

The acquisition module 535 queries the database 530M for content, based on the database type of the database 530M. Because each database type and each implementation of information management system databases have different records and fields, e.g., rows and columns, query commands for various types and implementations of databases are programmed into the acquisition module 535. To determine the format of the database 530M, the manufacturer of the report agent 510 may reverse-engineer the database 530M (and 530A). For example, the manufacturer of the report agent 510 may purchase licenses to the information management software that generates the database 530M and install the information management software on a test computing device. The manufacturer of the report agent 510 may then perform test runs of the information management software to generate a test copy of the database 530M. From the test copy of the database 530M, the manufacturer of the report agent 510 may create a data structure that includes the formats of the data structures used in the storage manager databases by various vendors. Table 2, shown below, illustrates a data structure that includes example formats of data structures that may be used in the storage manager databases generated from various vendor information management software.

TABLE 2

| Manufacturer | Column 1 | Column 2 | Column 3 | ... | Column N |
| --- | --- | --- | --- | --- | --- |
| Symantec ™ | Res. ID | Res. Type | Net. Addr. | ... | Storage Cap. |
| EMC² ® | Res. ID | Storage Pol. | Res. Priority | ... | Encrypt. Type |
| IBM ® | IMC ID | Mount Path | Res. ID | ... | Time Stamp |
| ... | | | | ... | |

The columns in Table 2 include manufacturer, column 1, column 2, column 3, and may include many more columns, up to a column N. In a first row of Table 2, a first manufacturer of information management software is listed as Symantec™. According to Table 2, the format of the data structure used in the system content file of information management software by Symantec™ includes a resource ID, followed by a resource type, a network address, additional columns, and a storage capacity of the identified resource. The format of the data structure used in the system content file of information management software by EMC²® may include a resource ID, followed by the type of storage policy, followed by the priority of the resource, and may end with a column for the type of encryption used for secondary copies of data from the identified resource. The format of the data structure used in the system content file of information management software by IBM® may include an information management cell (IMC) ID, a mount path for a resource, a resource ID, and a time stamp. While Table 2 provides examples of just a few manufacturers of information management software, and some columns, the list is not exhaustive.

The acquisition module 535 translates query results from the database 530M to be compatible with the respective content of the database 465A. in other words, the acquisition module 535 normalizes the query results from the database 530M to a common format. For example, the acquisition module 535 may query both databases for a field, i.e. column, titled Job ID. The query for the database 465A may return a table of fields of Job ID. By contrast, the equivalent query to the database 530M may return a table of objects from which Job ID may be extracted. The acquisition module 535 may execute a loop to read the Job ID, or other data, from each of the objects returned by the query of the database 530M so that the results from both queries can be joined or merged. Thus, the acquisition module 535 acquires and prepares database content for insertion into the interim database 540.

The interim database 540 receives content from the databases 465A and 530M to facilitate temporary storage and manipulation of the received content. The interim database 540 may be implemented with a fast-response architecture, such as an in-memory database. An in-memory database (IMDB; also main memory database or MMDB) is a database that primarily resides in main memory, and is typically only backed-up by non-volatile computer data storage. Main memory databases are faster than disk databases. Accessing data in memory reduces the I/O reading activity when, for example, querying the data. The interim database 540 stores and sorts the merged content from the databases 465A and 530M in preparation for graphical representation via the report user interface module 545.

The report user interface module 545 generates graphical reports in response to selections by a user and based on the content of the interim database 540. The report user interface module 545 uses the merged content stored by the interim database 540 to generate graphical reports that represent database content for multiple, and possibly heterogeneous, information management cells. In some implementations, the report user interface module 545 generates reports that are representative of all storage manager databases within the computing environment 500. The report user interface module 545 may generate graphical reports such as bar graphs and pie charts and may display the graphical reports with a graphical user interface. Examples of a graphical user interface and corresponding graphs and charts are illustrated in FIGS. 7-16 and will be discussed in more detail below.

The report user interface module 545 generates the graphical reports in response to selections by the user. For example, the report user interface module 545 may use a graphical user interface to display list boxes, drop-down menus, browse menus, radio buttons, and check boxes to enable the user to select from columns, or fields, of various databases and database tables. In response to the selections made by the user, the report user interface module 545 may sort or selectively extract content from the interim database 540. In some implementations, in response to the selections made by the user, the report user interface module 545 may provide query information to the acquisition module 535 to cause the acquisition module 535 to retrieve user-selected content from the databases 465A, 530M, and/or other storage manager databases.

By executing the report agent 510, any one or more of the information management cells 350 and 505 may acquire, normalize, and graphically represent content from other information management cells regardless of the homogeneity of the respective storage manager databases. In some implementations, the report agent 510 includes a number of software modules. However, in other implementations, the report agent 510 is a single non-modularized piece of software. As discussed above, the advantages of the report agent 510 include enabling an organization to create at-a-glance representations of the status of the computing environment 500. In other words, the reporting agent 510 enables the organization to graphically review content relating to all information management cells and all storage manager databases in the computing environment without regard to the types of database management systems that are in use by the storage managers.

The database report generation agent 510 may be stored on any one of a number of non-transitory computer-readable media, including CD, DVD, USB drive, floppy disk, portable non-volatile memory, magnetic disk, and the like. The database report generation agent 510 may also be transmitted to an information management cell, for execution, via wired or wireless signal. The database report generation agent 510 includes instructions which may cause a computing device to perform a method of generating reports for heterogeneous information management cells or heterogeneous storage manager databases.

FIG. 6 illustrates a method 600 of using a database report generation agent to generate reports for heterogeneous information management cells or heterogeneous storage manager databases. As discussed above, advantages of the database report generation agent include enabling an organization to review the status and/or needs of an entire computing system, rather than being limited to receiving separate reports for each type of storage manager database.

At block 605, a storage manager receives input from a user indicating one or more storage manager databases to query and indicate which portions of the database contents to retrieve. As discussed above, the storage manager may execute a report user interface module to receive various inputs from the user via user interface objects, such as text boxes, drop-down menus, browse menus, checkboxes, and the like. Through the report user interface module, the storage manager may receive query information from the user, such as: which databases to query, the types of the database, the names of the databases, the network addresses of the databases, and/or which fields and reports, e.g. columns and rows, of the database tables to query.

At block 610, the storage manager of one information management cell queries one or more storage manager databases of other information management cells for content. The storage manager queries the other storage manager databases for content based on the selections or other input received from the user. The storage manager may use proprietary or nonproprietary network communication techniques, such as TCP/IP, or the like, to communicate with the other storage manager databases. Prior to completing the query, the storage manager may have to determine the type of the databases of the other storage managers. The storage manager may use a lookup table to determine the type of the other databases and thereby cater the query commands to the type of databases being queried. In some implementations, the storage manager uses an acquisition module of the database report generation agent to perform the queries.

At block 615, the storage manager normalizes the query results to a common format. Because different types of databases return information in different formats, e.g., data elements versus data objects, the storage manager may use the acquisition module to convert the content of all queried information into, for example, the format of a relational database. By normalizing the content, the storage manager prepares the content for merging and sorting by an interim database.

At block 620, the storage manager merges the query results into an interim database. The interim database may be an in-memory database that executes in main memory of a computing device, such as the storage manager. The interim database enables the storage manager to sort or otherwise organize the results of the database queries.

At block 625, the storage manager graphically represents the retrieved database content. The storage manager may use the report user interface module to enable the user to the select a preferred graphical format for the content received from the storage manager database query. As will be shown below, the report user interface module may graphically render the queried information into a data table, a bar graph, a pie chart, or the like.

While the operations of database content acquisition, normalizing and graphing are disclosed as being performed by the storage manager, other computing devices within an information management cell may perform the disclosed operations of the method 600. In one implementation, a media agent or a client computing device executes the method 600. In other implementations computing devices that are external to any of the information management cells of an organization can perform the method 600 to produce the graphical representations based on heterogeneous databases or information management cells.

Figure 7:
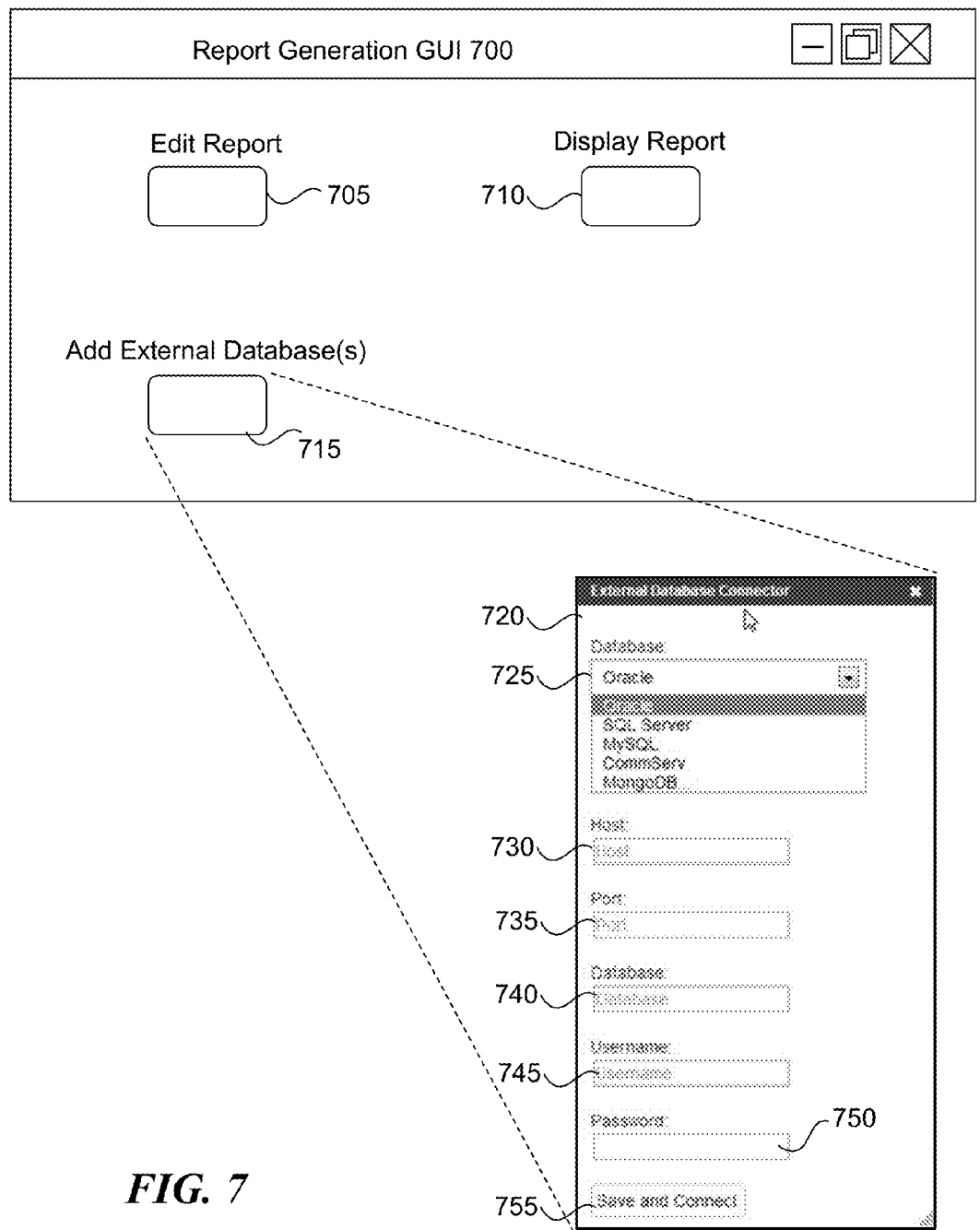
FIG. 7 is a block diagram illustrating a graphical user interface for editing a database report.

FIG. 7 illustrates a report generation graphical user interface (GUI) 700 that might be generated by the report user interface module 545 (shown in FIG. 5) to enable a user to create custom reports using content from heterogeneous databases. The report generation GUI 700 may include an edit report button 705, a display report button 710, and an add external database button 715. One advantage of enabling the user to use a GUI to generate reports from databases is that a person without a programming background or any programming experience can generate charts that can represent the health, security, or status of one or more networks or information management cells.

The edit report button 705 enables a user to select from numerous categories and fields within tables of databases, such as storage manager databases. In response to selection of the edit report button 705 by a user, the report generation GUI 700 may open a new window or change the display of the report generation GUI 700 in order to render additional options and controls.

The display report button 710 enables a user to select from numerous types of displays and enables the user to select one or more fields within tables of databases to graphically display. Similar to the edit report button 705, the display report button 710 may cause the report generation GUI 700 to open a new window or change views on the report generation GUI 700 in order to display additional options and controls. In one implementation, in response to selection of the display report button 710 by the user, the report generation GUI 700 opens one or more of the reports page 1300 of FIG. 13 and the dashboard 1500 of FIG. 15. Each of the reports page 1300 and the dashboard 1500 are discussed in detail below.

The add external database button 715 enables the report generation GUI 700 to include storage manage databases that are external to an information management cell of the computing device that is executing the report generation GUI 700. Notably, the add external database button enables the incorporation of database content from relatively heterogeneous databases. The storage manager, media agents, client computing devices, or other computing devices may execute the report generation GUI 700. These computing devices may also execute the database report generation agent 510 (shown in FIG. 5) to generate custom reports based on heterogeneous storage manager databases.

In response to selection, by the user, of the add external database button 715, the report generation GUI 700 opens a dialog box 720 to enable the user to enter information for connecting to an external database. The dialog box 720 may be named 'External Database Connector.' The dialog box 720 may include a drop-down menu 725 to enable a user to select from one of various types or vendors of databases. The drop-down menu 725 may include database types such as Oracle, SQL Server, MySQL, CommServer, MongoDB, and others. In some implementations, the drop-down menu 725 enables a user to select 'database not listed here' to allow the user to browse additional names of databases. The dialog box 720 includes a text box 730 to enable the user to enter a network address of a host of the external database. The dialog box 720 includes a text box 735 to enable the user to enter a port number, such as 1633, of the external database. The dialog box 720 includes a text box 740 to enable the user to enter a name of the external database. The dialog box 720 includes a text boxes 745 and 750 to enable the user to enter security credentials such as a username and password. The button 755 enables the user to save the external database settings and connects to the external database identified by the entries made in the dialog box 720.

Figure 8:
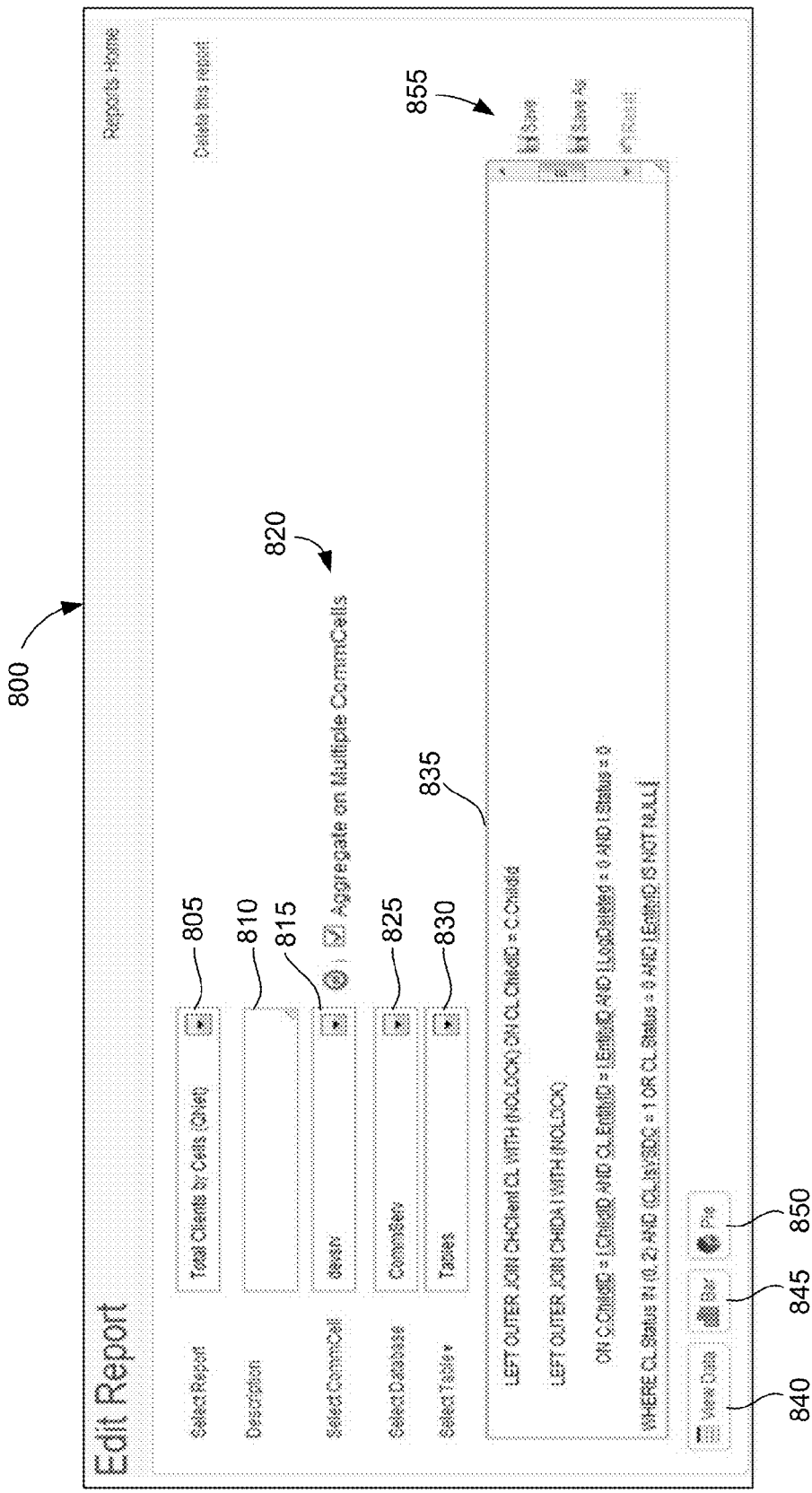
FIG. 8 is a screen shot of a graphical user interface for editing a database report.

FIG. 8 illustrates an edit report GUI 800 that the report generation GUI 700 opens, in response to a user clicking or selecting the edit report button 705. The GUI 800 enables the user to determine which information will be generated in the graphical report. The GUI 800 includes several input menus, such as a select report menu 805, a description box 810, a information management cell menu 815, and aggregate option 820, a database menu 825, a table menu 830, and a script text box 835. The GUI 800 also includes several output control objects such as view data button 840, bar chart button 845, pie chart button 850, and save buttons 855.

Figure 12:
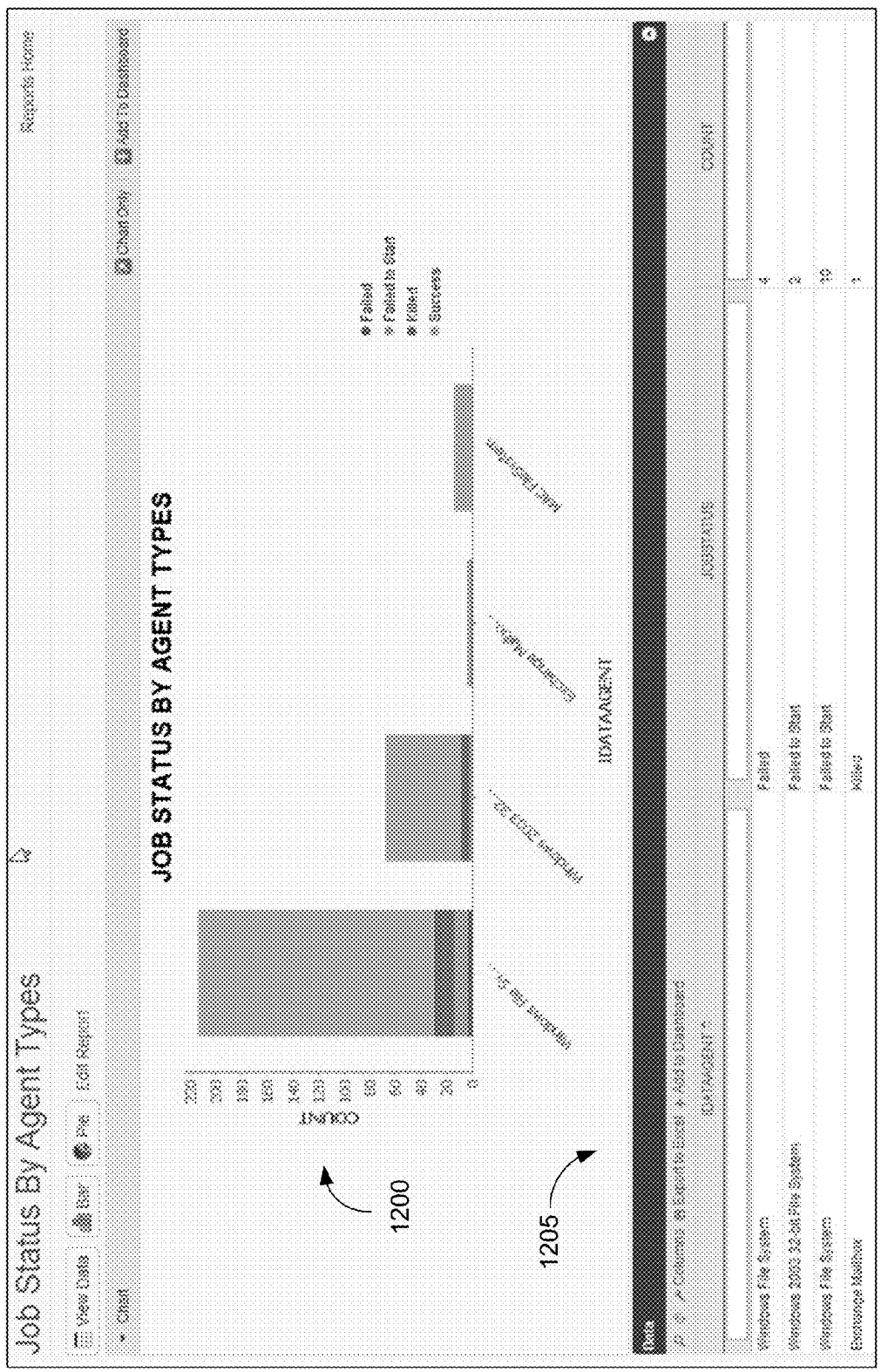
FIG. 12 is a screen shot of a graphical representation of part of an information management database.

The input menus enable the user to easily define the features to be included in a report. The select report menu 805 enables the user to select from one of multiple predetermined reports. The predetermined reports, such as "Total Clients by Cells (QNet)", may be created using the GUI 800 and by selecting one of the save buttons 855. The select report menu 805 may include predetermined reports such as: "Total Clients by Cells (QNet)", "Current Media Size Per Copy", "Job Status By Agent Types", "SubClient Count By SLA Reason", "Total App Size By ClientGroup", "Data Growth Per Library", "Largest 10 Clients By App Size In Last 7 Days", and "Top 5 Errors In Last 24 Hours" (as shown in FIG. 12) (where some of these reports may be specific to resources managed by data storage management products manufactured by CommVault of Oceanport, N.J.). While these reports may be predetermined, a user may create and name other reports as he or she wishes.

The remaining input menus enable the user to create a new report. The description box 810 enables a user to create a name for a new report. In one implementation, an information management cell is called a CommCell. The information management cell menu 815 enables the user to select one or more information management cells to be queried during report generation or creation. The aggregate option 820 enables a user to select multiple information management cells from the CommCell menu 815 while the check box is selected. Otherwise, the CommCell menu 815 will create the graphical report using information from just one information management cell. The database menu 825 enables the user to select from one of multiple databases that exists within the information management cell. Previously, reference was made to a storage manager database. In one implementation, a storage manager is called a CommSery database, and a storage manager database is one of multiple databases that may be selected with the database menu 825. The database menu 825 enables the user to also select other databases that may organize or manage data or metadata within an information management cell, such as a QNet database or an SRM database.

Figure 11:
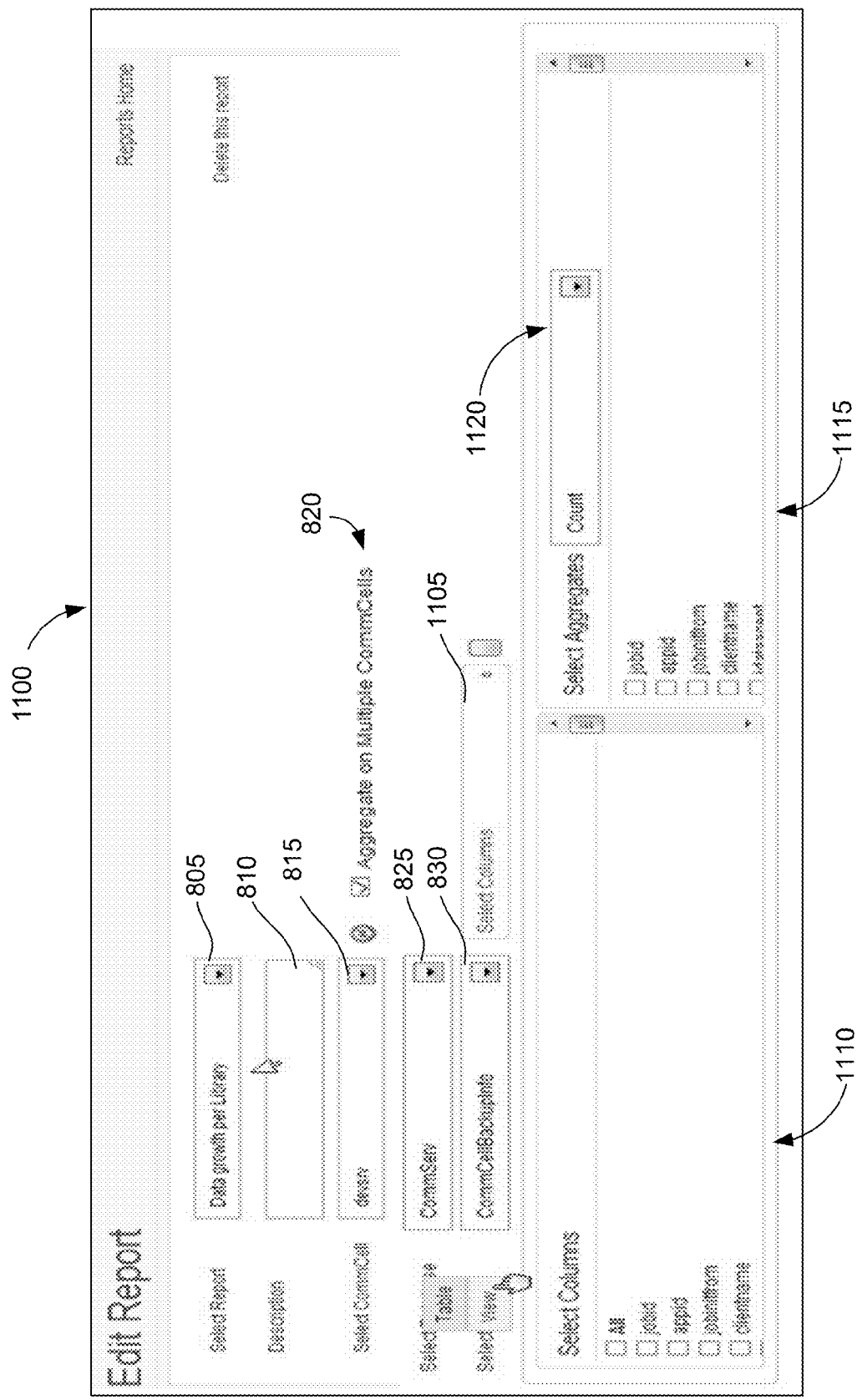
FIG. 11 is a screen shot of a graphical user interface for editing a database report.

The table menu 830 allows the user to select between using a 'table' option or a 'view' option to generate the graphical report. The GUI 800 illustrates the 'table' option as selected, but the GUI 1100 of FIG. 11 shows the 'view' option being selected. The 'view' option is discussed in more detail below, in connection with FIG. 11. The 'table' option may indicate particular tables in the database, whereas the 'view' option indicates a group of tables in the database. Additional options for the table menu 830 will be described with respect to FIG. 9.

The script text box 835 is an input that enables a user to manually enter database commands or subroutines, such as SQL queries. The example database commands illustrated in the script text box 835 are executed when at least one of the view data button 840, the bar chart button 845, or the pie chart button 850 is selected. The example database commands that are illustrated include instances of the 'LEFT OUTER JOIN' command. The 'LEFT OUTER JOIN' command is used to join or merge portions of multiple tables, e.g., CHClient and CHIDA. The script text box 835 offers the advantage of enabling SQL-savvy programmers to further customize the reports.

As discussed above, the GUI 800 also includes various output controls, such as the view data button 840, the bar chart button 845, the pie chart button 850, and the save buttons 855. In response to the user selecting one or more of the view data button 840, the bar chart button 845, and the pie chart button 850, the GUI 800 generates corresponding graphical reports, which will be illustrated in later figures. In some implementations the display report button 710 of FIG. 7 includes the functionality of one or more of the view data button 840, the bar chart button 845, and the pie chart button 850.

In summary, the edit report GUI 800 enables the user to either select a predetermined or previously saved report to execute. The edit report GUI 800 also enables a user to name and define new reports which may be executed with the user-friendly view data button 840, bar chart button 845, and pie chart button 850.

Figure 9:
FIG. 9 is a screen shot of another view of the graphical user interface for editing a database report.

FIG. 9 illustrates the GUI 800 with the table menu 830 expanded to show examples of tables that are included in a storage manager database that the user can select for addition to the graphical report. In the illustrated example, the user selects an information management cell named 'devsrv' and selects the storage manager database named 'CommServ'. The table menu 830, therefore, illustrates example tables that are included in the storage manager database, CommServ. Example tables include APP_AppCompat, which indicates the compatibility of applications; APP_Application, which lists applications within the information management cell; and APP_BackupSetName, which lists names of backup sets. In some implementations, after a table is selected, another drop-down menu will appear to enable the user to select one or more columns from the selected table for display via the graphical report.

Figure 10:
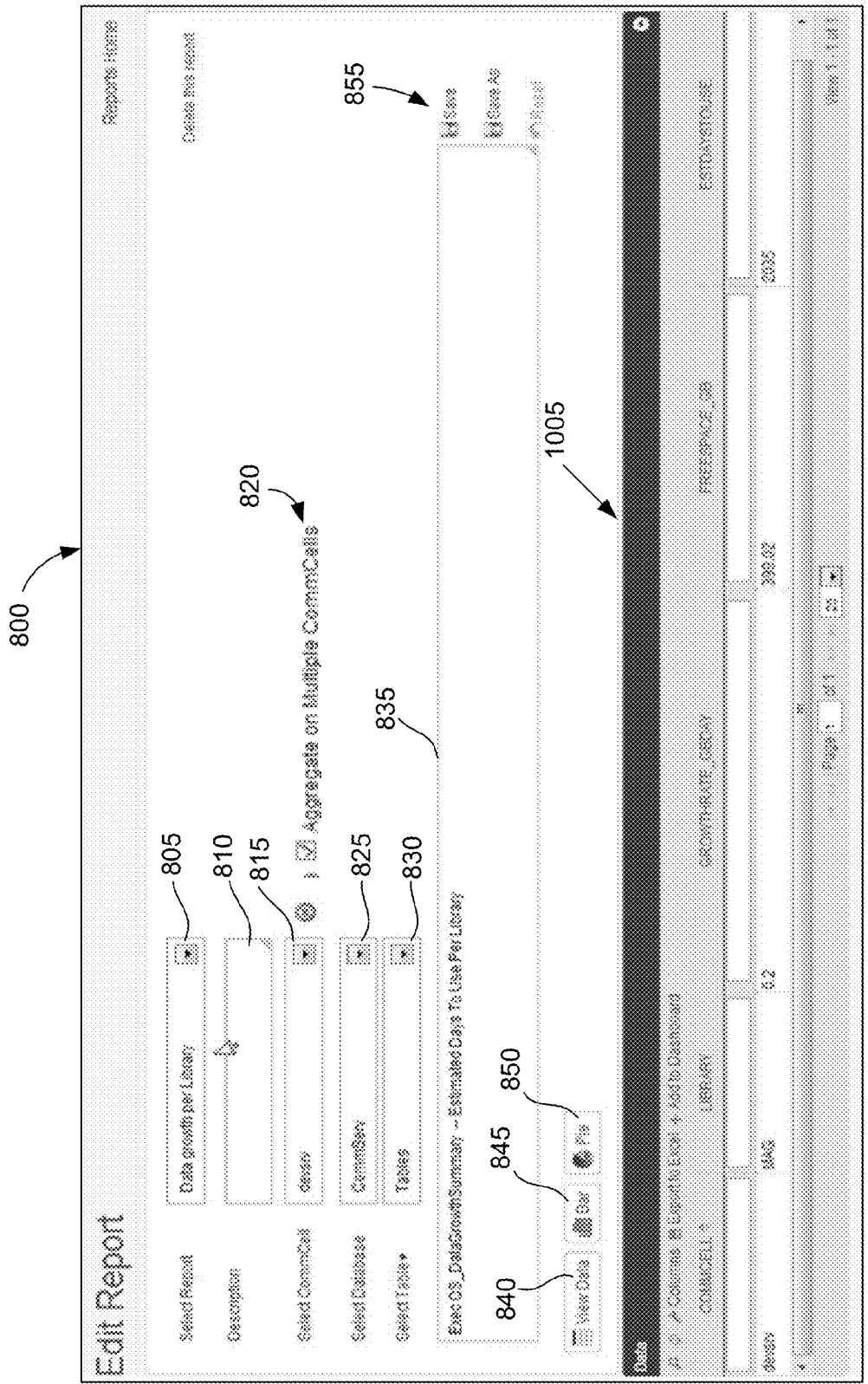
FIG. 10 is a screen shot of another view of the graphical user interface for editing a database report.
Figure 16:
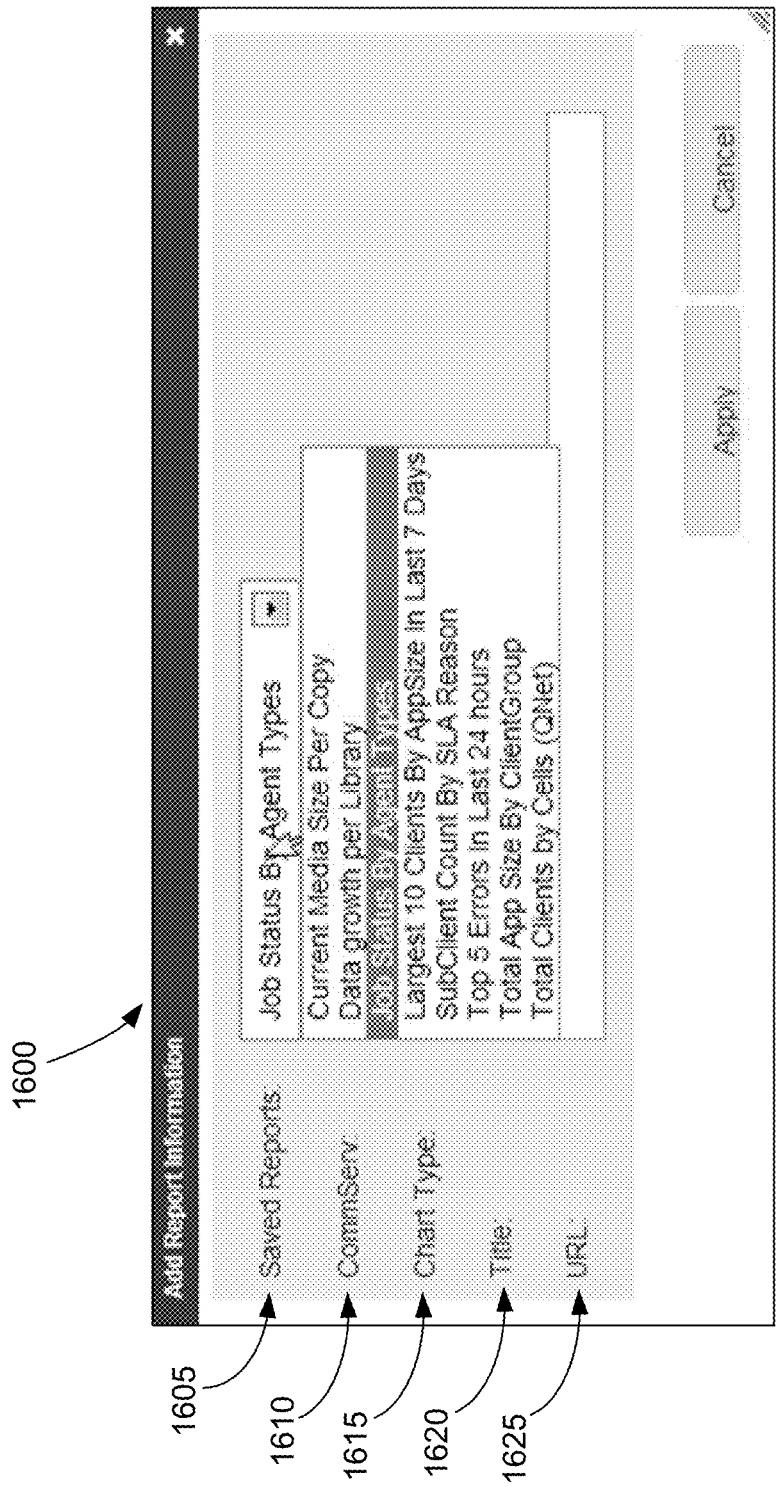
FIG. 16 is a screen shot illustrating a dialog box for adding custom reports to the system of FIG. 15.

FIG. 10 illustrates the GUI 800 after the user has selected the view data button 840 for a selected report named "Data growth per Library". The GUI 800 displays a data table 1005. The data table 1005 includes five columns: COMMCELL, LIBRARY, GROWTHRATE_GBDAY, FREESPACE_GB, AND ESTDAYSTOUSE. These columns may have been defined when the "Data growth per Library" report was created, and they may provide estimates of how many gigabytes of memory remain before secondary storage resources are depleted. The data table 1005 also includes options to export the displayed data to an Excel worksheet, to adjust the settings of the columns, and to add the data table to a dashboard. The dashboard is a customized report interface where user-defined reports may be saved onto a user interface for constant monitoring or for fast recall. An example dashboard is illustrated in FIG. 16 and discussed below.

FIG. 11 illustrates a GUI 1100 that enables a user to create reports based on a 'view' option rather than a 'table' option with table menu 830. The GUI 1100 is otherwise similar to GUI 800. The 'table' option selects one table from the database selected from database menu 825. By contrast, the 'view' option provides a selection of a group of tables. The table menu 830 illustrates a selection of the CommCellBackupInfo view. The CommCellBackupInfo view may, for example, be a combination of the APP_BackupSetFilterFile table, the APP_BackupSetName table, the APP_AppToDataPath table, and the APP_BackupSetProp table (all shown in FIG. 9). Other views may also be selected.

The menu box 1105 enables the user to select columns from the CommCellBackupInfo view. The menu box 1105 may also enable the selection of tables, rows, or other portions of the CommCellBackupInfo view.

The GUI 1100 populates menus 1110 and 1115 with column select and aggregate select options, in response to determining that the menu 1105 is set to 'Select Columns'. The select columns menu 1110 determines which content will be displayed as an x-axis in a bar graph. The select aggregates menu 1115 determines which variables or content will be used to itemize the quantity of the y-axis of the bar chart. The menu 1120 determines the y-axis quantity for each x-axis column or bar. The menu 1120 may include count, average, maximum, minimum, and sum. An example of a graphical report that clearly illustrates the aggregation techniques that are enabled by the GUI 1100 is shown in FIG. 12.

FIG. 12 illustrates a bar graph 1200 that shows a report of job status by agent types. To generate this report using the options from the GUI 1100, the user selects iDataAgent in the columns menu 1110, selects jobstatus in the aggregates menu 1115, and selects count from the menu 1120. The selection(s) from the columns menu 1100 determines the x-axis of the bar graph, and the selection from the menu 1120 determines y-axis of the bar graph. The selections from the aggregates menu 1115 itemize the quantity represented by the y-axis. In other words, selections from the aggregates menu 1115 provide a granular representation of the count for each of the iDataAgents. FIG. 12 also illustrates a data menu 1205 showing a tabular representation of the bar graph 1200. As shown, many customizable options are available simply by selecting one or more check boxes and then selecting the bar chart button. Advantageously, the disclosed charting techniques enable non-programmers to generate complex graphs to express the health and status of the information management system.

Figure 13:
FIG. 13 is a screen shot illustrating an interface for selecting from multiple custom reports.

FIG. 13 illustrates a reports page 1300 that includes a list of reports that have been created by the user and saved. The reports page 1300 can be configured to provide quick links to frequently used reports. More custom reports can be added by using the save buttons 855 (shown on FIG. 8) after entering report criteria. Each of the custom reports displayed on the reports page 1300 was mentioned previously as optional reports that were selectable using the report menu 805 (shown on FIG. 8).

Figure 14:
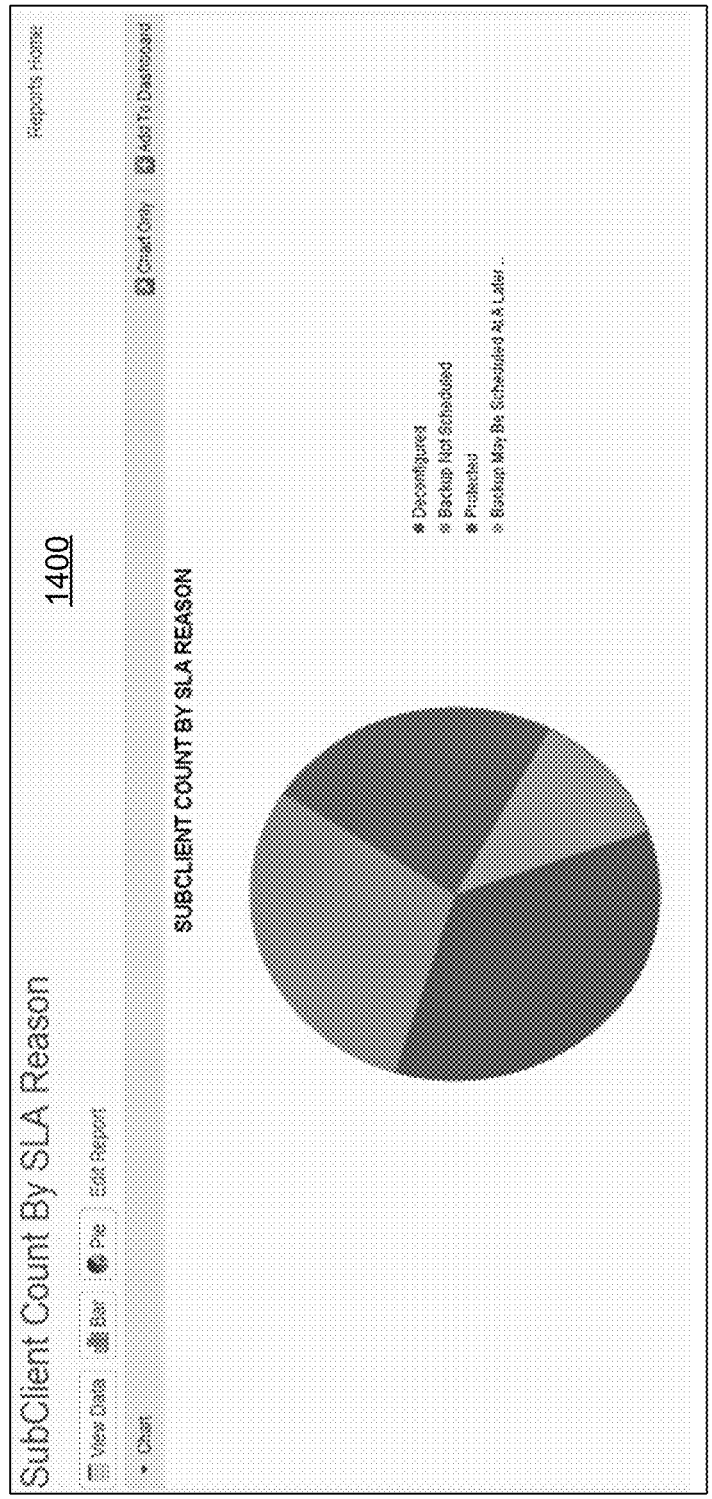
FIG. 14 is a screen shot of a custom report generated from the graphical user interfaces of FIGS. 8-11.

FIG. 14 illustrates an example report page 1400 that can be generated simply by selecting or clicking on the "Subclient Count By SLA Reason" icon of the reports page 1300. The sub client count by SLA reason report quickly measures the overall health of the backup procedures occurring in a computing environment. The SLA is determined according to Equation 1, shown below.

$$SLA = [\text{Number of Protected Subclients}] * 100 / ([\text{Number of Protected Subclients}] + [\text{Number of Non-Protected Subclients}]).$$  Equation 1.

The SLA is determined by multiplying the number of protected clients by 100 and dividing that quantity by the sum of the number of protected the clients and the number of non-protected sub clients. In short, SLA is a measurement to show what percentage of the computing environment or information management system is being backed up.

Figure 15:
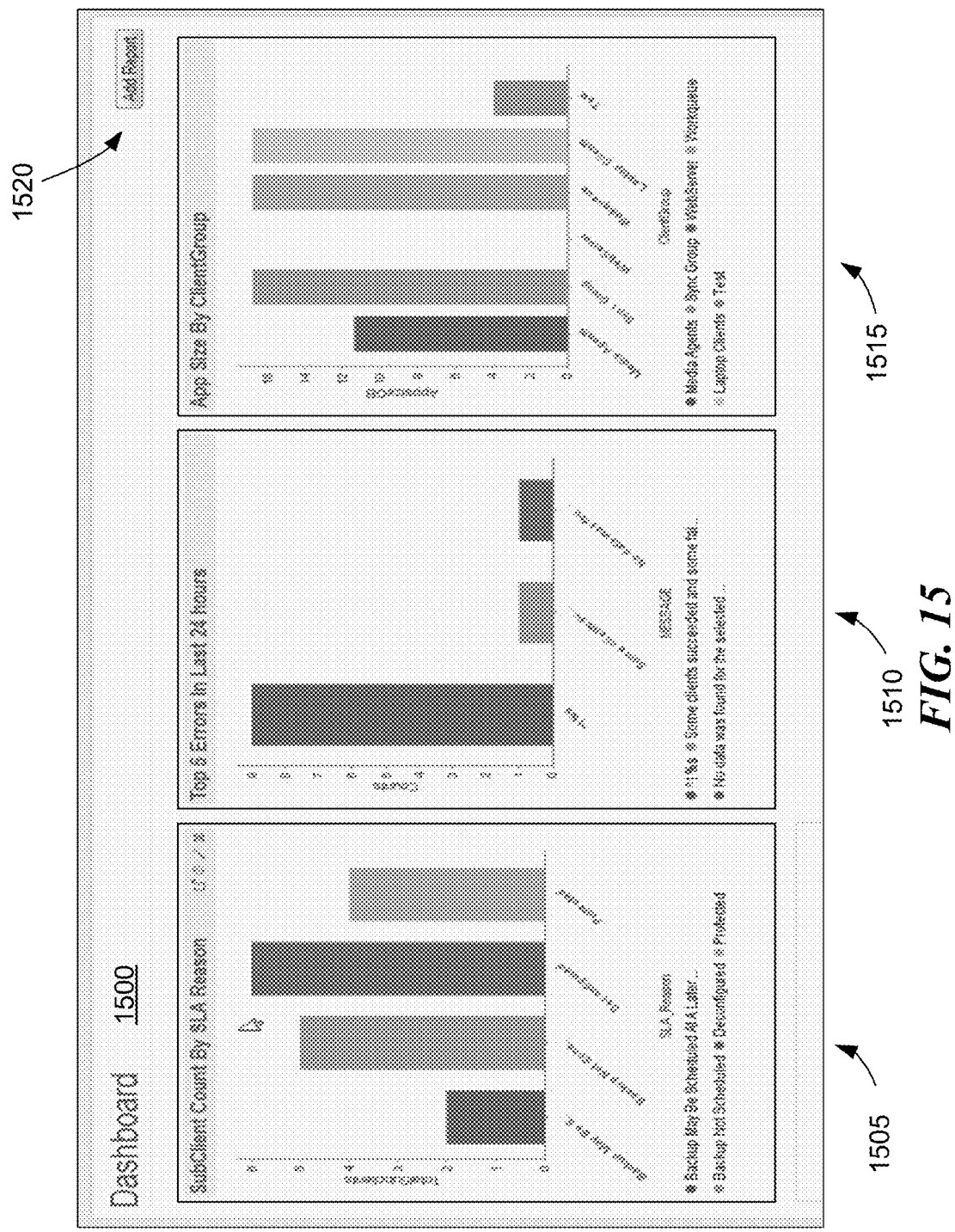
FIG. 15 is a screen shot illustrating a system for displaying multiple custom reports.

FIG. 15 illustrates a dashboard 1500. The dashboard 1500 displays a preview of custom reports that have been added to the dashboard by the user. Some reports may be displayed by default, but each report can be replaced, and additional custom reports may be added. As mentioned previously during the discussion of FIG. 10, additional reports may be added to the dashboard 1500 by selecting the "+Add to Dashboard" link that is included at the top of each data table, bar chart, and pie chart generated by the GUIs 700, 800, and 1100. FIG. 15 illustrates the dashboard 1500 having three custom reports. Custom report 1505 is the SubClient Count by SLA Reason report. Custom report 1510 is the Top 5 Errors in Last 24 Hours custom report. Custom report 1515 is the App Size by ClientGroup custom report. As can be seen, the dashboard 1500 may be used to evaluate the backup health or information management system health of an entire network of an organization rather than being limited to individual reports for each database type or each information management cell.

The add report button 1520 enables a user to continue adding custom reports to the dashboard 1500. In response to selecting the add report button 1520, the dashboard 1500 opens an add report dialog box 1600, illustrated in FIG. 16.

The add report dialog box 1600 provides some options that are similar to the options of GUI 800 and GUI 1100. For example, the add report dialog box 1600 includes a saved reports drop-down menu 1605, a storage manager menu 1610, a chart type menu 1615, and a title menu 1620. Additionally, the add report dialog box 1600 includes a URL text box 1625. The URL text box 1625 enables a user to import one or more saved reports from another storage manager, from a virtual machine, or from a website or FTP address. The imported reports may include a predetermined list of previously stored report configurations. By importing lists of predetermined or received reports, the add report dialog box 1600 and dashboard 1500 can enable almost any computer-literate user to generate reports about the information management system being monitored.

Figure 17:
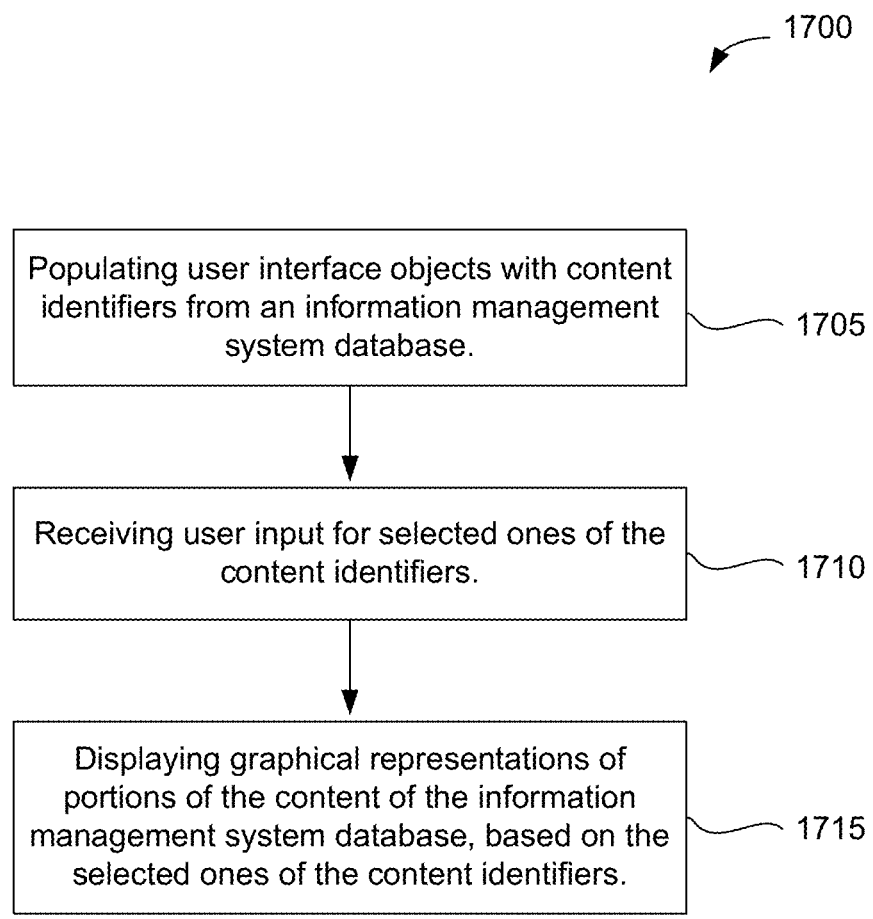
FIG. 17 is a flow chart representation of a process for generating graphical reports from an information management database.

FIG. 17 illustrates a method 1700 of graphically representing the content of information management system databases, with a GUI, to provide custom reports associated with an information management system. A computing device may increase the number of people available to generate custom reports by presenting easy-to-use menus via the GUI. Instead of needing a person with database programming skills to generate the custom reports, any computer-literate person becomes eligible to generate custom and variable reports about the information management system.

At block 1705, the GUI populates user interface objects with content identifiers from the information management system database. The content identifiers may include table identifiers, view identifiers (e.g., groups of tables), and column identifiers. The GUI may populate one or more interface objects, such as drop-down lists, combo boxes, check boxes, and other menus with the database content identifiers. The GUI may then associate a particular graphical interface function with each interface object so that when the user selects a content identifier with a particular interface object, the user is programming the graphical representation of at least part of the content of the information management system database.

At block 1710, the GUI receives user input for selected ones of the content identifiers. As discussed above, the GUI may receive user input from various interface objects, such as drop-down lists, combo boxes, and checkboxes. The GUI may display the graphical representations in response to a particular input from the user, such as the selection of a graph or plot button.

At block 1715, the GUI displays graphical representation of portions of the content of the information management system database, based on the selected ones of the content identifiers and based on the interface object used to identify the selected ones of the content identifiers. For example, the GUI may associate a column menu with an x-axis of a graph or chart, so that when a user selects a content identifier, such as Job ID, the GUI associates the content identifier with the x-axis of the graph. Accordingly, without any special database programming skills, a user may generate custom and complex graphs that identify characteristics of the information management system.

CONCLUSION

Systems and modules described herein may comprise software, firmware, hardware, or any combination(s) of software, firmware, or hardware suitable for the purposes described herein. Software and other modules may reside on servers, workstations, personal computers, computerized tablets, PDAs, smart phones, and other devices suitable for the purposes described herein. Modules described herein may be executed by a general-purpose computer, e.g., a server computer, wireless device, or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," "host," "host system," and the like, are generally used interchangeably herein and refer to any of the above devices and systems, as well as any data processor. Furthermore, aspects of the invention can be embodied in a special purpose computer or data processor that is specifically programmed, configured, or constructed to perform one or more of the computer-executable instructions explained in detail herein.

Software and other modules may be accessible via local memory, a network, a browser, or other application in an ASP context, or via another means suitable for the purposes described herein. Examples of the technology can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein.

Examples of the technology may be stored or distributed on computer-readable media, including magnetically or optically readable computer disks, hard-wired or preprogrammed chips (e.g., EEPROM semiconductor chips), nanotechnology memory, biological memory, or other data storage media. Indeed, computer-implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the systems described herein. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain examples are presented below in certain forms, the applicant contemplates the various aspects of the invention in any number of claim forms. Accordingly, the applicant reserves the right to add additional claims after filing the application to pursue such additional claim forms for other aspects of the invention.

The invention claimed is:

1. An information management system configured to create graphical reports associated with a status of the information management system, the system comprising:
    a first information management cell having a first storage manager coupled, via a first network, to a first plurality of computing devices,
        wherein the first storage manager includes a first storage manager database to store a first data storage policy associated with the first plurality of computing devices,
            wherein the first data storage policy includes rules that determine a frequency by which the first storage manager causes data that is stored by the first plurality of computing devices to be backed up by a secondary storage device,
            wherein the first storage manager database is a first type of database; and
    a second information management cell connected to the first information management cell and having a second storage manager coupled, via a second, network to a second plurality of computing devices,
        wherein the second storage manager includes a second storage manager database to store a second data storage policy associated with the second plurality of computing devices,
            wherein the second storage manager database is a second type of database that is different from the first type of database,
        wherein the second storage manager includes a memory storing instructions,
        wherein the second storage manager includes a processor coupled to the memory,
            wherein the instructions are executable by the processor to cause the second storage manager to:
                receive an input from a user to query the first storage manager database and the second storage manager database,
                identify the first storage manager database as the first type of database and the second storage manager database as the second type of database,
                query the first storage manager database using a first set of query commands,
                identify a data format of the information received in response to the first set of query commands as a first data format,
                query the second storage manager database using a second set of query commands,
                identify a data format of the information received in response to the second set of query commands as a second data format,
                    wherein the first set of query commands are different from the second set of query commands and the first set of query commands are based on identifying the first storage manager database as the first type of database,
                normalize information received in response to the query of the first storage manager database to be compatible with the second data format,
                merge and sort the normalized results and information received in response of the query of the second storage manager into an interim database associated with a report generation agent that generates the displayed reports,
                    wherein the merged results represent database content for heterogeneous information management cells,
                display a graphical report of the information in the interim database, based on the input received from the user;
                populate a user interface with a list of content identifiers for views, tables, or columns of the first storage manager database and of the second storage manager database,
                    wherein the instructions to cause the second storage manager to receive the input from the user includes instructions to cause the second storage manager to receive user selections of some of the list of content identifiers with the user interface, wherein the user interface includes with table names and column or row names from the common database format, and wherein the interface is configured to permit the user to select sets of information displayed via the user interface, and to query the first and second storage manager databases without requiring the user to be able to program in a database language.

2. The system of claim 1 wherein the first type of database is one of:

a document-oriented database, a distributed database, and an object-relational database, wherein the instructions further cause the second storage manager to receive a non-table object in response to using first set of query commands on the first type of database, wherein the instructions to cause the second storage manager to normalize the received information includes converting the non-table object received from the first storage manager database into a database table.

3. The system of claim 1 wherein the instructions to cause the second storage manager to receive the input includes instructions to cause the second storage manager to receive a network address of the first storage manager database, wherein the instructions to cause the second storage manager to identify the first storage manager as the first type includes instructions to cause the second storage manager to query the first storage manager database to determine the type of the first storage manager database by using the network address of the first storage manager database received from the user.

4. The system of claim 1 wherein the instructions to cause the second storage manager to identify the first storage manager as the first type includes instructions to cause the second storage manager to query the first storage manager database to determine the type of the first storage manager database by using a look-up table.

5. The system of claim 1 wherein the graphical report includes at least one of a data table, a bar graph, and a pie chart, wherein the database management system models include at least three of flat models, hierarchical models, network models, relational models, dimensional models, object-relational models, document models, and object models.

6. The system of claim 1, further comprising:

associating a graphing function with the user interface so that the at least one selection from the list of content identifiers is associated with the graphing function, wherein displaying the graphical report includes using the graphing function to display the at least one selection from the list of content identifiers.

7. The system of claim 1 wherein the user interface includes at least one of a drop-down menu, a combo box, a list of check boxes, and a list of radio buttons to enable interaction with the user interface without typing database commands.

8. A method for displaying graphical reports of a status of an information management system, wherein the information management system includes a first information management subnetwork having a first plurality of computing devices and a second information management subnetwork having a second plurality of computing devices, the method comprising:

populating, with a computing device, a graphical user interface object with a list of content identifiers for heterogeneous information management system databases, wherein the heterogeneous information management system databases include:

a first information management database of a first database management system model, wherein the first information management database includes data associated with the first plurality of computing devices, wherein the data in the first information management database is in a first data format, and a second information management database of a second database management system model, wherein the second information management database includes data associated with the second plurality of computing devices, wherein the data in the second information management database is in a second data format, wherein the first database management system model and the second database management system model are different from one another;

receiving input from a user via the graphical user interface, wherein the input includes at least one selection of a content identifier from the list of content identifiers, wherein the graphical user interface provides multiple predetermined reports, wherein the predetermined reports include a top backup errors within a predetermined time period or data growth per data storage library, and wherein the graphical user interface is configured to permit the user to perform the selection without requiring the user to be able to program in a database language;

determining database management system models for the heterogeneous information management system databases;

querying the heterogeneous information management system databases based on the at least one selection from the list of content identifiers and based on the database management system models of the heterogeneous information management system databases;

normalizing results from the query, wherein normalizing results from the query includes converting a portion of the results attributable to the first information management database in the first data format to the second data format, wherein the normalized results represent database content for heterogeneous information management system databases; and displaying graphical reports of the normalized results, based on the at least one selection from the list of content identifiers that was selected by the user, so that the method provides a bridge between different database types to generate and display reports containing data from both the first and second information management databases.

9. The method of claim 8 wherein the content identifiers include one or more of views, tables, and columns of the heterogeneous information management system databases.

10. The method of claim 8 wherein the graphical reports includes at least one of a data table, a bar graph, and a pie chart, wherein the database management system models include at least three of flat models, hierarchical models, network models, relational models, dimensional models, object-relational models, document models, and object models.

11. The method of claim 8, further comprising receiving a network address or network identifier from the user for at least one of the heterogeneous information management system databases,
   wherein determining the database management system models for the heterogeneous information management system databases includes using the network address or the network identifier to request the database management system models directly from the heterogeneous information management system databases over a network.

12. The method of claim 8, further comprising:
   associating a graphing function with the user interface so that the at least one selection from the list of content identifiers is associated with the graphing function,
      wherein displaying the graphical reports includes using the graphing function to display the at least one selection from the list of content identifiers.

13. The method of claim 8 wherein the graphical user interface includes at least one of a drop-down menu, a combo box, a list of check boxes, and a list of radio buttons to enable interaction with the graphical user interface without typing database commands.

14. The method of claim 8, further comprising:
   merging the normalized results from the query by entering the normalized results into an interim database associated with a report generation agent that generates the displayed reports,
      wherein the interim database is an in-memory database that operates in main memory of the computing device; and
   sorting the results with the interim database prior to displaying the graphical results.

15. At least one non-transitory tangible computer-readable medium storing instructions which, when executed by at least one data processing device, performs a method for displaying graphical reports of a status of an information management system, wherein the information management system includes a first information management subnetwork having a first plurality of computing devices and a second information management subnetwork having a second plurality of computing devices, the method comprising:
   populating, with a computing device, a graphical user interface object with a list of content identifiers for heterogeneous information management system databases,
      wherein the heterogeneous information management system databases include:
         a first information management database of a first database management system model,
            wherein the first information management database includes data associated with the first plurality of computing devices,
            wherein the data in the first information management database is in a first data format, and
         a second information management database of a second database management system model,
            wherein the second information management database includes data associated with the second plurality of computing devices,
            wherein the data in the second information management database is in a second data format,
      wherein the first database management system model and the second database management system model are different from one another;
   receiving input from a user via the graphical user interface,
      wherein the input includes at least one selection of a content identifier from the list of content identifiers,
      wherein the graphical user interface provides multiple predetermined reports,
      wherein the predetermined reports include a top backup errors within a predetermined time period or data growth per data storage library, and
      wherein the graphical user interface is configured to permit the user to perform the selection without requiring the user to be able to program in a database language;
   determining database management system models for the heterogeneous information management system databases;
   querying the heterogeneous information management system databases based on the at least one selection from the list of content identifiers and based on the database management system models of the heterogeneous information management system databases;
   normalizing results from the query, wherein normalizing results from the query includes converting a portion of the results attributable to the first information management database in the first data format to the second data format,
      wherein the normalized results represent database content for heterogeneous information management system databases; and
   displaying graphical reports of the normalized results, based on the at least one selection from the list of content identifiers that was selected by the user,
      so that the method provides a bridge between different database types to generate and display reports containing data from both the first and second information management databases.

16. The at least one non-transitory tangible computer-readable medium of claim 15 wherein the content identifiers include one or more of views, tables, and columns of the heterogeneous information management system databases.

17. The at least one non-transitory tangible computer-readable medium of claim 15 wherein the graphical reports includes at least one of a data table, a bar graph, and a pie chart,
   wherein the database management system models include at least three of flat models, hierarchical models, network models, relational models, dimensional models, object-relational models, document models, and object models.

18. The at least one non-transitory tangible computer-readable medium of claim 15, further comprising receiving a network address or network identifier from the user for at least one of the heterogeneous information management system databases,
   wherein determining the database management system models for the heterogeneous information management system databases includes using the network address or the network identifier to request the database management system models directly from the heterogeneous information management system databases over a network.

19. The at least one non-transitory tangible computer-readable medium of claim 15, further comprising:

associating a graphing function with the user interface so that the at least one selection from the list of content identifiers is associated with the graphing function, wherein displaying the graphical reports includes using the graphing function to display the at least one selection from the list of content identifiers.

\* \* \* \* \*